(12) United States Patent
Lee

(10) Patent No.: US 8,208,965 B2
(45) Date of Patent: Jun. 26, 2012

(54) DISPLAYING BROADCAST INFORMATION IN A MOBILE COMMUNICATION TERMINAL

(75) Inventor: Won Jong Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 136 days.

(21) Appl. No.: 12/713,120

(22) Filed: Feb. 25, 2010

(65) Prior Publication Data

US 2010/0267370 A1  Oct. 21, 2010

(30) Foreign Application Priority Data

Apr. 21, 2009  (KR) .................. 10-2009-0034536

(51) Int. Cl.
*H04B 1/38* (2006.01)
*H04L 29/06* (2006.01)

(52) U.S. Cl. ..................................... 455/566; 455/414.3

(58) Field of Classification Search ................ 455/414.3
See application file for complete search history.

(56) References Cited

U.S. PATENT DOCUMENTS

| 6,928,262 B1 * | 8/2005 | Kanemitsu | 455/3.06 |
| 2003/0084447 A1 | 5/2003 | Lee | |
| 2003/0093814 A1 * | 5/2003 | Birmingham | 725/136 |
| 2008/0081640 A1 | 4/2008 | Tran et al. | |

FOREIGN PATENT DOCUMENTS

| EP | 1916842 | 4/2008 |
| FR | 2909508 | 6/2008 |

* cited by examiner

*Primary Examiner* — Nick Corsaro
*Assistant Examiner* — Joel Ajayi
(74) *Attorney, Agent, or Firm* — Lee, Hong, Degerman, Kang & Waimey

(57) ABSTRACT

A method for displaying broadcast information in a mobile terminal is provided. The method comprises displaying a broadcast channel list including identification information of at least one or more broadcast channels; receiving an input including a search condition for a random one of the at least one or more broadcast channels; searching relevant broadcast information on the random broadcast channel for information on a specific broadcast program to correspond to the inputted search condition; and displaying the searched information on the specific broadcast program.

23 Claims, 29 Drawing Sheets

(a)

(b)

DISPLAYING BROADCAST INFORMATION IN A MOBILE COMMUNICATION TERMINAL

CROSS-REFERENCE TO RELATED APPLICATIONS

Pursuant to 35 U.S.C. §119(a), this application claims the benefit of earlier filing date and right of priority to Korean Application No. 10-2009-0034536, filed on Apr. 21, 2009, the contents of which are hereby incorporated by reference herein in their entirety.

RELATED FIELD

This disclosure relates to a mobile terminal, and more particularly, to a mobile terminal and method for displaying broadcast information. In one embodiment, the mobile terminal has a broadcast channel displaying function.

BACKGROUND

A mobile communication terminal may be configured to perform various functions. Examples of such functions include communicating data and voice, capturing images and video via a camera, recording audio, playing music files via a speaker system, and displaying images and video on a display. Some terminals include additional functionality which supports game playing, while other terminals are configured as multimedia players. More recently, terminals have been configured to receive broadcast and multicast signals which permit viewing of content such as videos and television programs. It is desirable to support and increase the functionality of mobile communication terminals. Software and hardware improvements, as well as changes and improvements in the structural components of the terminal generally help achieving better functionality.

Typically, a broadcast terminal displays a broadcast channel list in a manner of displaying a broadcast channel list constructed with broadcast channels or displaying a title of a currently broadcasted broadcast program per broadcast channel together with a broadcast channel list. However, the related art methods do not support providing various kinds of information on a broadcast program broadcasted on each broadcast channel using a broadcast channel list.

SUMMARY

Additional advantages, objects, and features will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention a mobile terminal comprising a display configured to display a broadcast channel list including identification information of at least one or more broadcast channels; a user input unit configured to receive an input including a search condition for broadcast program information related to at least one or more broadcast channels; and a controller configured to search relevant broadcast information for one or more broadcast channels that correspond to the search condition, and control the display to display related information about one or more broadcast programs that satisfy the search condition. The search condition comprises at least one of a date condition and a time condition.

In one embodiment, the user input unit receives the input directed to the search condition covering a plurality of broadcast channels or a single broadcast channel. The mobile terminal may further comprise a wireless communication unit configured to receive the relevant broadcast information; and a memory configured to store the received relevant broadcast information under the control of the controller. If the inputted search condition includes a specific time, the controller searches for information on a broadcast program broadcasted at the specific time on a random broadcast channel. The display displays remaining broadcast time information from the specific time as the searched information on the broadcast program broadcasted at the specific time under the control of the controller.

Depending on implementation, if the inputted search condition includes a specific time interval, the controller searches for information on a broadcast program broadcasted on a random broadcast channel in the specific time interval. If the inputted search condition includes a specific date, the controller searches for information on a broadcast program broadcasted on the random broadcast channel on the specific date. If the inputted search condition includes a specific date interval, the controller searches for information on a broadcast program broadcasted on the random broadcast channel in the specific date interval. The controller sets a broadcast channel list editing condition to the inputted search condition and wherein the display displays the broadcast channel list edited to correspond to the set broadcast channel list editing condition.

In accordance with another embodiment, a method for displaying broadcast information in a mobile terminal comprises displaying a broadcast channel list including identification information of at least one or more broadcast channels; receiving an input including a search condition for a random one of the at least one or more broadcast channels; searching relevant broadcast information on the random broadcast channel for information on a specific broadcast program to correspond to the inputted search condition; and displaying the searched information on the specific broadcast program. The search condition comprises at least one of a date condition or a time condition.

The method may further comprise receiving the relevant broadcast information; and storing the received relevant broadcast information. The searching comprises determining if the inputted search condition includes a specific time, and in response searching for information on a broadcast program broadcasted at the specific time on the random broadcast channel. The broadcast program information displaying comprises displaying remaining broadcast time information from the specific time as the searched information on the broadcast program broadcasted at the specific time. The searching comprises determining if the inputted search condition includes a specific time interval, and in response searching for information on a broadcast program broadcasted on the random broadcast channel in the specific time interval.

In one embodiment, the searching comprises determining if the inputted search condition includes a specific date, and in response searching for information on a broadcast program broadcasted on the random broadcast channel on the specific date. The searching comprises determining if the inputted search condition includes a specific date interval, and in response searching for information on a broadcast program broadcasted on the random broadcast channel in the specific date interval. The method may further comprise setting a broadcast channel list editing condition for the inputted search condition, wherein the broadcast channel list displaying comprises displaying the broadcast channel list edited to correspond to the set broadcast channel list editing condition.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF EXEMPLARY EMBODIMENTS

Reference will now be made in detail to one or more embodiments, examples of which are illustrated in the accompanying drawings. Wherever possible, the same reference numbers will be used throughout the drawings to refer to the same or like parts.

The suffixes 'module' and 'unit' for the elements used in the following description are given or used in common by considering facilitation in writing this disclosure only but fail to have meanings or roles discriminated from each other.

First of all, mobile terminals described in this disclosure may include a mobile phone, a smart phone, a laptop computer, a digital broadcast terminal, a PDA (personal digital assistants), a PMP (portable multimedia player), a navigation system and the like. It would be apparent to those skilled in the art that the configurations according to an embodiment described in this disclosure would be also applicable to stationary terminal such as a digital TV, a desktop computer and the like.

Figure 1:
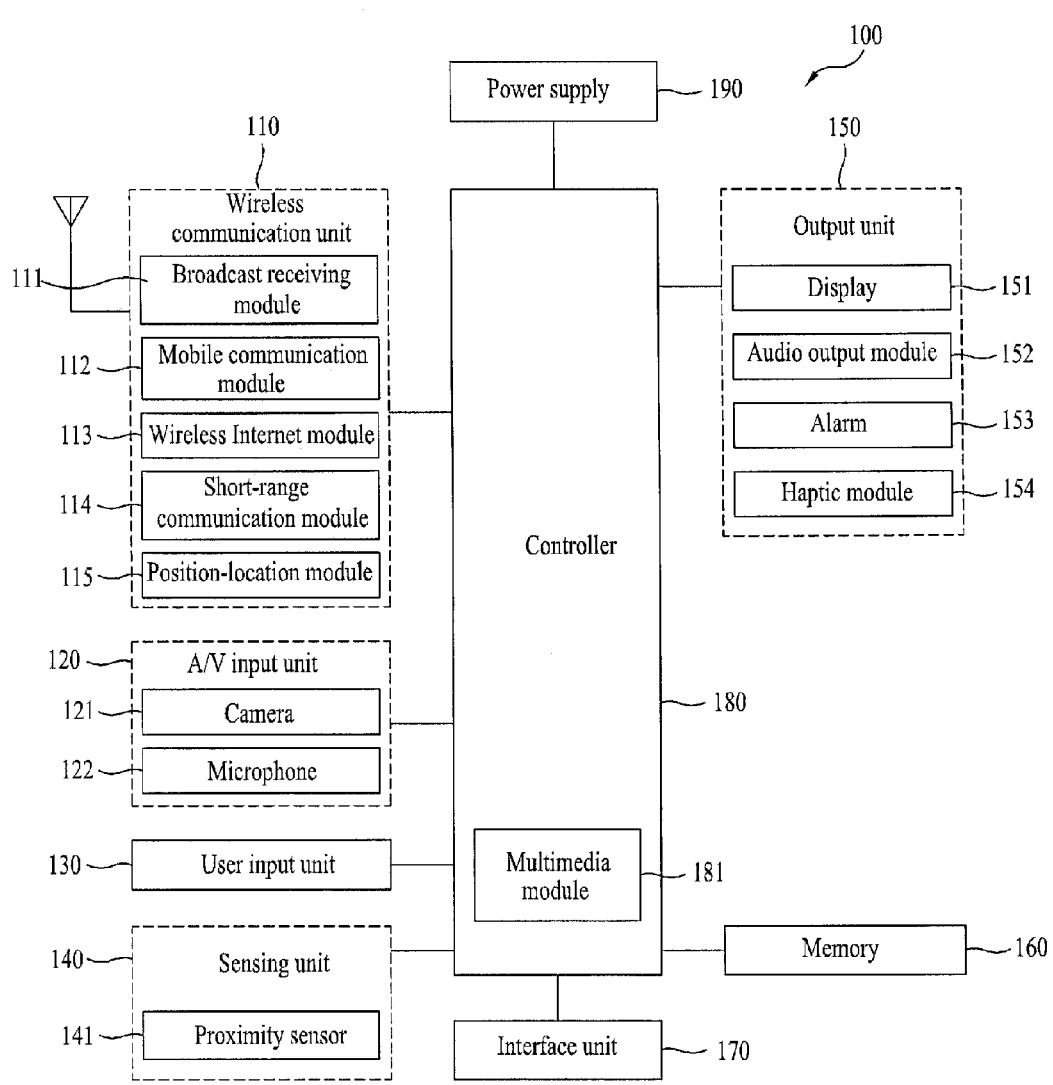
FIG. 1 is a block diagram of a mobile terminal according to one embodiment.

FIG. 1 is a block diagram of a mobile terminal according to one embodiment of the present invention. Referring to FIG. 1, a mobile terminal 100 according to one embodiment includes a wireless communication unit 110, an AN (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented. In the following description, the above elements of the mobile terminal 100 are explained in sequence.

In one embodiment, the wireless communication unit 110 includes one or more components which permits wireless communication between the mobile terminal 100 and a wireless communication system or network within which the mobile terminal 100 is located. For instance, the wireless communication unit 110 may include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information may be provided via a mobile communication network. In this case, the broadcast associated information may be received by the mobile communication module 112.

The broadcast associated information may be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By way of a non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 may be configured suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others. The wireless internet module 113 supports Internet access for the mobile terminal 100. This module may be internally or externally coupled to the mobile terminal 100. In this case, the wireless Internet technology may include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few. The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames may be displayed on the display 151.

The image frames processed by the camera 121 may be stored in the memory 160 or may be externally transmitted via the wireless communication unit 110. Optionally, at least two cameras 121 may be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 may include a proximity sensor 141.

The output unit 150 generates outputs relevant to the senses of sight, hearing, touch and the like. And, the output unit 150 includes the display 151, an audio output module 152, an alarm unit 153, a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays may be implemented in a transparent or optical transmittive type, which may be named a transparent display. As a representative example for the transparent display, there is TOLED (transparent OLED) or the like. A rear configuration of the display 151 may be implemented in the optical transmittive type as well. In this configuration, a user may see an object in rear of a terminal body via the area occupied by the display 151 of the terminal body.

One or more displays 151 may be provided to the mobile terminal 100 in accordance with the implemented configuration of the mobile terminal 100. For instance, a plurality of displays may be arranged on a single face of the mobile terminal 100 in a manner of being spaced apart from each other or being built in one body. Alternatively, a plurality of displays may be arranged on different faces of the mobile terminal 100.

In case that the display 151 and a sensor for detecting a touch action (hereinafter called 'touch sensor') configures a mutual layer structure (hereinafter called 'touchscreen'), it is possible to use the display 151 as an input device as well as an output device. In this case, the touch sensor may be configured as a touch film, a touch sheet, a touchpad or the like.

The touch sensor may be configured to convert a pressure applied to a specific portion of the display 151 or a variation of a capacitance generated from a specific portion of the display 151 to an electric input signal. Moreover, it is possible to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 may know whether a prescribed portion of the display 151 is touched.

Referring to FIG. 1, a proximity sensor (not shown in the drawing) may be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) may be classified as the proximity sensor.

In the following, for the purpose of example, an action involving a pointer approaching the touchscreen without contacting with the touchscreen where the pointer is recognized as located on the touchscreen is referred to as 'proximity touch'. And, an action involving a pointer actually touching the touchscreen is referred to as 'contact touch'. The meaning of the position on the touchscreen proximity-touched by the pointer means the position of the pointer which approximately vertically corresponds to a point on the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern may be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 may output a signal for announcing the event occurrence by way of vibration as well as video or audio signal. The video or audio signal may be outputted via the display 151 or the audio output unit 152. Hence, the display 151 or the audio output module 152 may be regarded as a part of the alarm unit 153.

The haptic module 154 generates various tactile effects that may be sensed by a user. Vibration is a representative one of the tactile effects generated by the haptic module 154. Strength and pattern of the vibration generated by the haptic module 154 may be controllable depending on implementation. For instance, different vibrations may be outputted in a manner of being synthesized together or may be outputted in sequence.

The haptic module 154 may generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 may be implemented to enable a user to sense the tactile effect through a tactile sensory output felt by a finger, hand, arm or the like as well as to transfer the tactile effect through a direct contact. Optionally, at least two haptic modules 154 may be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) may be stored in the memory unit 160. Moreover, data for various patterns of vibration and/or sound outputted in case of a touch input to the touchscreen may be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 may operate in association with web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module may be implemented as an electronic chip, without limitation, for storing various kinds of information for authenticating a use authority of the mobile terminal 100 and may include User Identify Module (UIM), Subscriber Identify Module (SIM), Universal Subscriber Identity Module (USIM) and/or the like. A device having the identity module (hereinafter called 'identity device') may be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power may operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 may perform a pattern recognizing process for recognizing a writing input and a picture drawing input carried out on the touchscreen as characters or images, respectively. The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes may be implemented with a software application written in any suitable programming language and may be stored in memory such as the memory 160, and executed by a controller or processor, such as the controller 180.

Figure 2A:
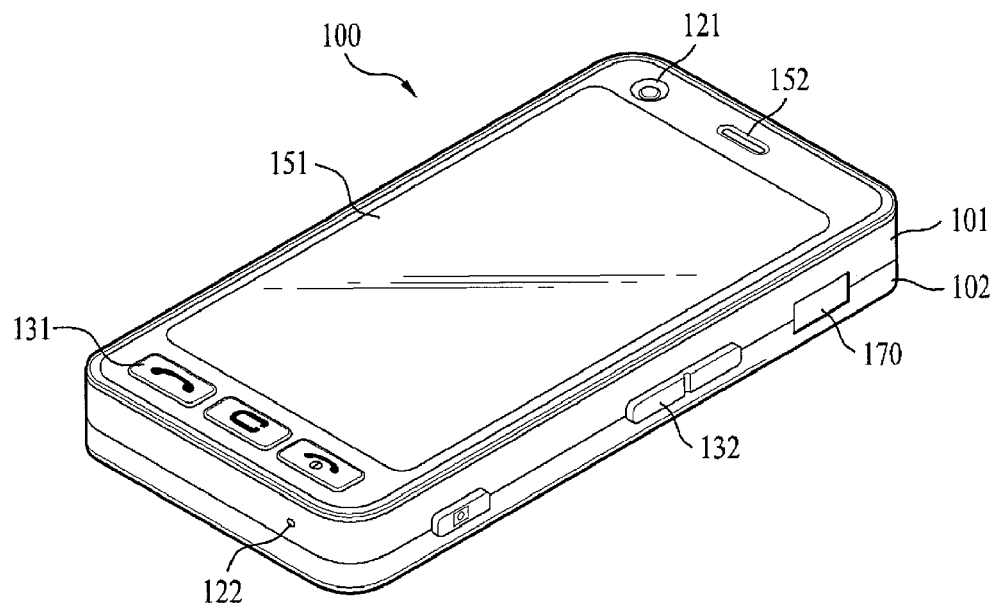
FIG. 2A is a front perspective diagram of a mobile terminal according to one embodiment.

FIG. 2A is a front perspective diagram of a mobile terminal according to one embodiment of the present invention. The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For the purpose of example, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof In the present embodiment, the case may be divided into a front case 101 and a rear case 102. Various electric/electronic parts are loaded in a space provided between the front and rear cases 101 and 102. Optionally, at least one middle case may be further provided between the front and rear cases 101 and 102 in addition.

The cases 101 and 102 are formed by injection molding of synthetic resin or may be formed of metal substance such as stainless steel (STS), titanium (Ti) or the like for example. A display 151, an audio output unit 152, a camera 121, user input units 130/131 and 132, a microphone 122, an interface 180 and the like may be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 may be provided to lateral sides of the front and rear cases 101 and 102.

The input unit 130 is manipulated to receive a command for controlling an operation of the terminal 100. And, the input unit 130 may include a plurality of manipulating units 131 and 132. The manipulating units 131 and 132 may be named a manipulating portion and may adopt any mechanism of a tactile manner that enables a user to perform a manipulation action by experiencing a tactile feeling.

Content inputted by the first or second manipulating unit 131 or 132 may be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like may be inputted to the second manipulating unit 132.

Figure 2B:
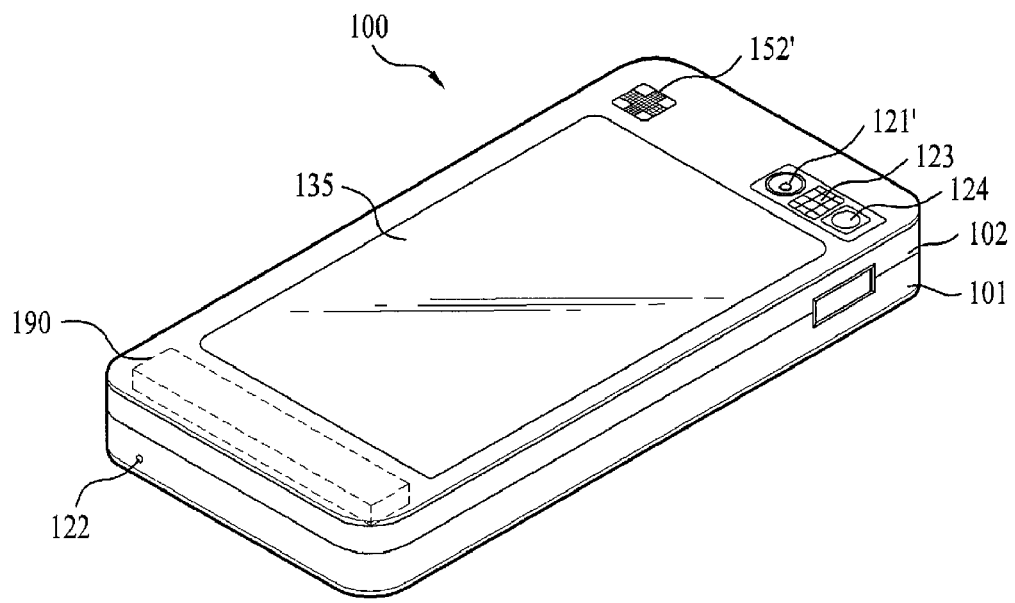
FIG. 2B is a rear perspective diagram of a mobile terminal according to one embodiment.

FIG. 2B is a perspective diagram of a backside of the terminal shown in FIG. 2A. Referring to FIG. 2B, a camera 121' may be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' may be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' may be provided to the backside of the terminal body. The additional audio output unit 152' may implement a stereo function together with the former audio output unit 152 shown in FIG. 2A and may be used for implementation of a speakerphone mode in talking over the terminal.

A broadcast signal receiving antenna 124 may be additionally provided to the lateral side of the terminal body as well as an antenna for communication or the like. The antenna 124 constructing a portion of the broadcast receiving module 111 shown in FIG. 1 may be retractably provided to the terminal body.

A power supply unit 190 for supplying a power to the terminal 100 is provided to the terminal body. And, the power supply unit 190 may be configured to be built within the terminal body. Alternatively, the power supply unit 190 may be configured to be detachably connected to the terminal body.

A touchpad 135 for detecting a touch may be additionally provided to the rear case 102. The touchpad 135 may be configured in a light transmittive type like the display 151. In this case, if the display 151 is configured to output visual information from its both faces, it is possible to recognize the visual information via the touchpad 135 as well. The information outputted from both of the faces may be entirely controlled by the touchpad 135. Alternatively, a display is further provided to the touchpad 135 so that a touchscreen may be provided to the rear case 102 as well.

The touchpad 135 is activated by interconnecting with the display 151 of the front case 101. The touchpad 135 may be provided in rear of the display 151 in parallel. The touchpad 135 may have a size equal to or smaller than that of the display 151.

Figure 3:
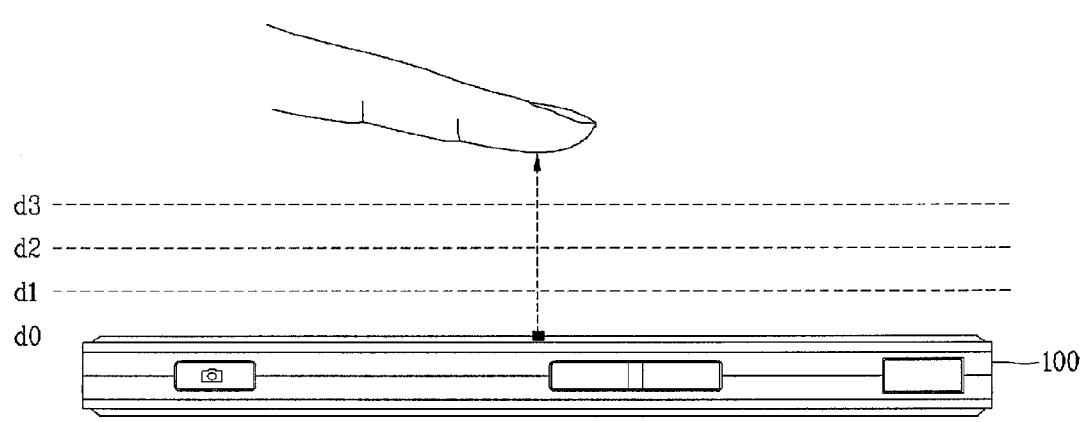
FIG. 3 is a diagram to explain the concept of proximity depth of a proximity sensor according to one embodiment.

The proximity sensor 141 described with reference to FIG. 1 is explained in detail with reference to FIG. 4 as follows. FIG. 3 is a conception diagram for explaining a proximity depth of a proximity sensor. Referring to FIG. 3, when such a pointer as a user's finger, a pen and the like approaches the touchscreen, a proximity sensor 141 provided within or in the vicinity of the touchscreen detects the approach of the pointer and then outputs a proximity signal.

The proximity sensor 141 may be configured to output a different proximity signal according to a distance between the pointer and the proximity-touched touchscreen (hereinafter named 'proximity depth).

In FIG. 3, exemplarily shown is a cross-section of the touchscreen provided with a proximity sensor capable to three proximity depths for example. And, it is understood that a proximity sensor capable of proximity depths amounting to the number smaller than 3 or equal to or greater than 4 is possible.

In detail, in case that the pointer is fully contacted with the touchscreen (d0), it is recognized as a contact touch. In case that the pointer is located to be spaced apart from the touchscreen in a distance smaller than d1, it is recognized as a proximity touch to a first proximity depth. In case that the pointer is located to be spaced apart from the touchscreen in a distance between d1 and d2, it is recognized as a proximity touch to a second proximity depth. In case that the pointer is located to be spaced apart from the touchscreen in a distance smaller than d3 or equal to or greater than d2, it is recognized as a proximity touch to a third proximity depth. In case that the pointer is located to be spaced apart from the touchscreen in a distance equal to or greater than d3, it is recognized as a proximity touch is released.

Hence, the controller 180 may recognize the proximity touch as one of various input signals according to the proximity depth and position of the pointer. And, the controller 180 may perform various operation controls according to the various input signals.

Figure 4A:
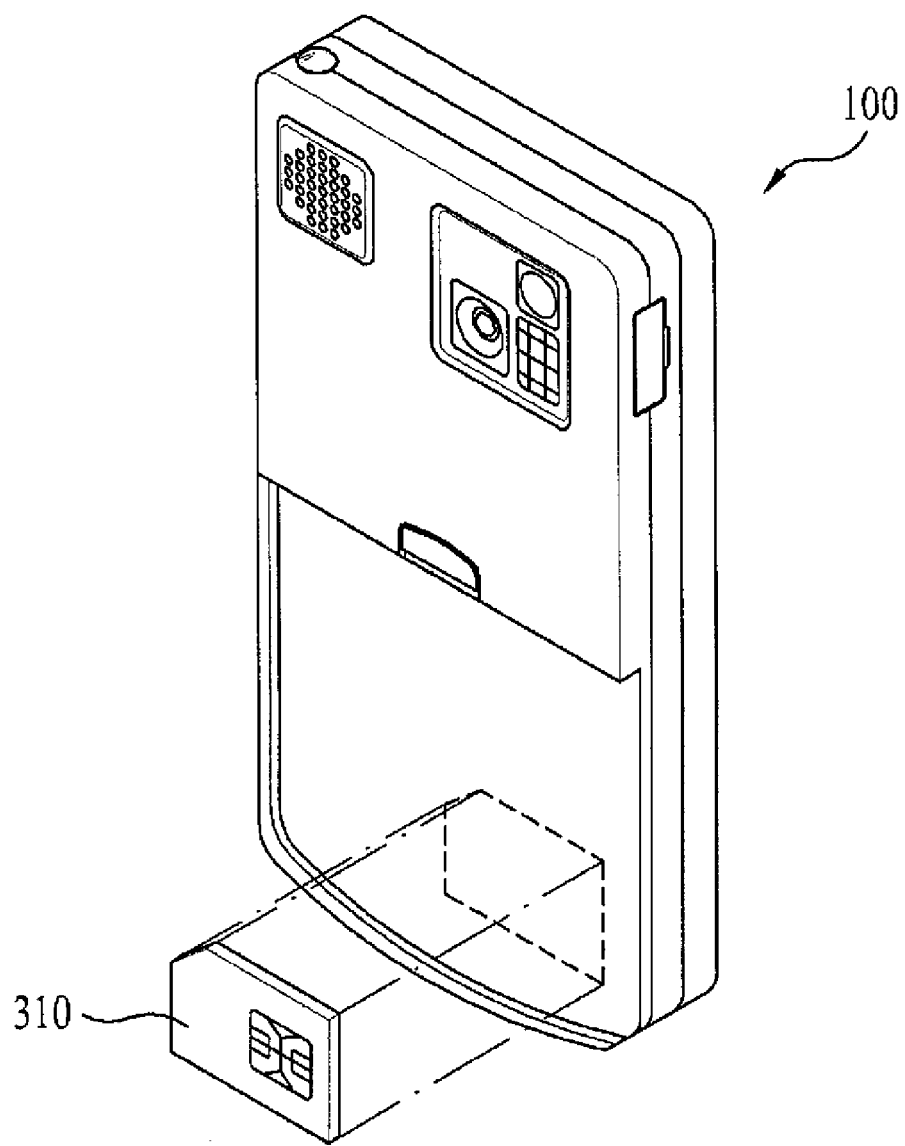
FIG. 4A and FIG. 4B are perspective diagrams of a backside of a mobile terminal according to one embodiment, in which an identify device is detachably assembled to the mobile terminal.
Figure 4B:
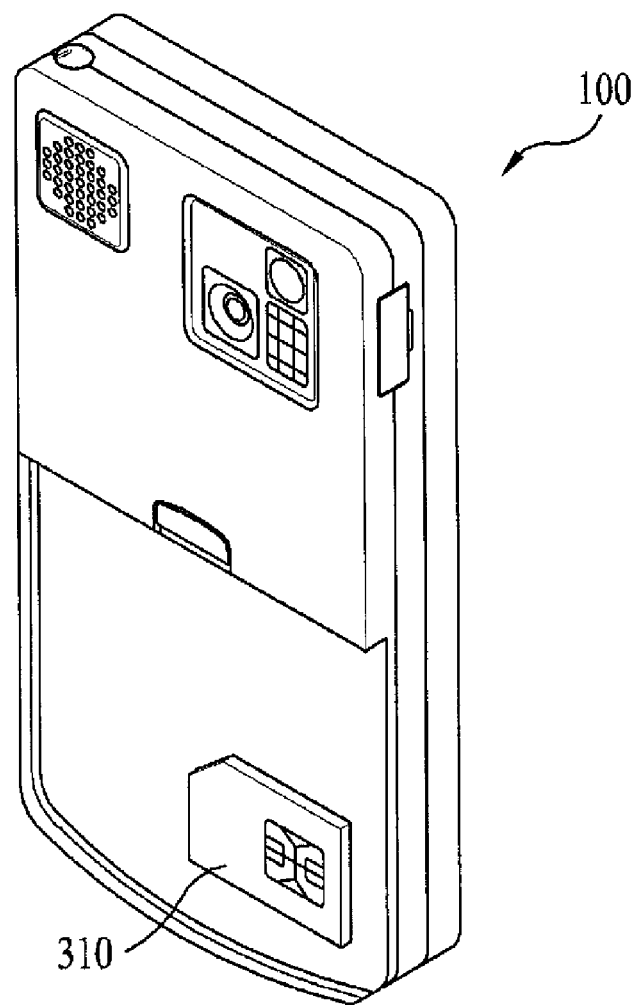

FIG. 4A and FIG. 4B are backside perspective diagrams of a mobile terminal according to one embodiment of the present invention, in which an identity device is detached/attached to/from the mobile terminal. In this case the identity device may include a SIM card for example.

Referring to FIG. 4A and FIG. 4B, an identity device 310 is provided detachable from the terminal 100. Therefore, an old identity device may be replaced by a new identity device to be loaded in the terminal 100. Of course, the identity device 310 may be loaded in the terminal 100 by being combined with the interface unit 170. Alternatively, the identity device 310 may be loaded in the terminal 100 by being connected to a connector separately provided for the assembly to the identity device 310. A connecting means (not shown in the drawing) for connecting the identity device 10 to the terminal 100 may be provided to any place of the terminal such as a backside, a lateral side, a front side and the like.

Figure 5:
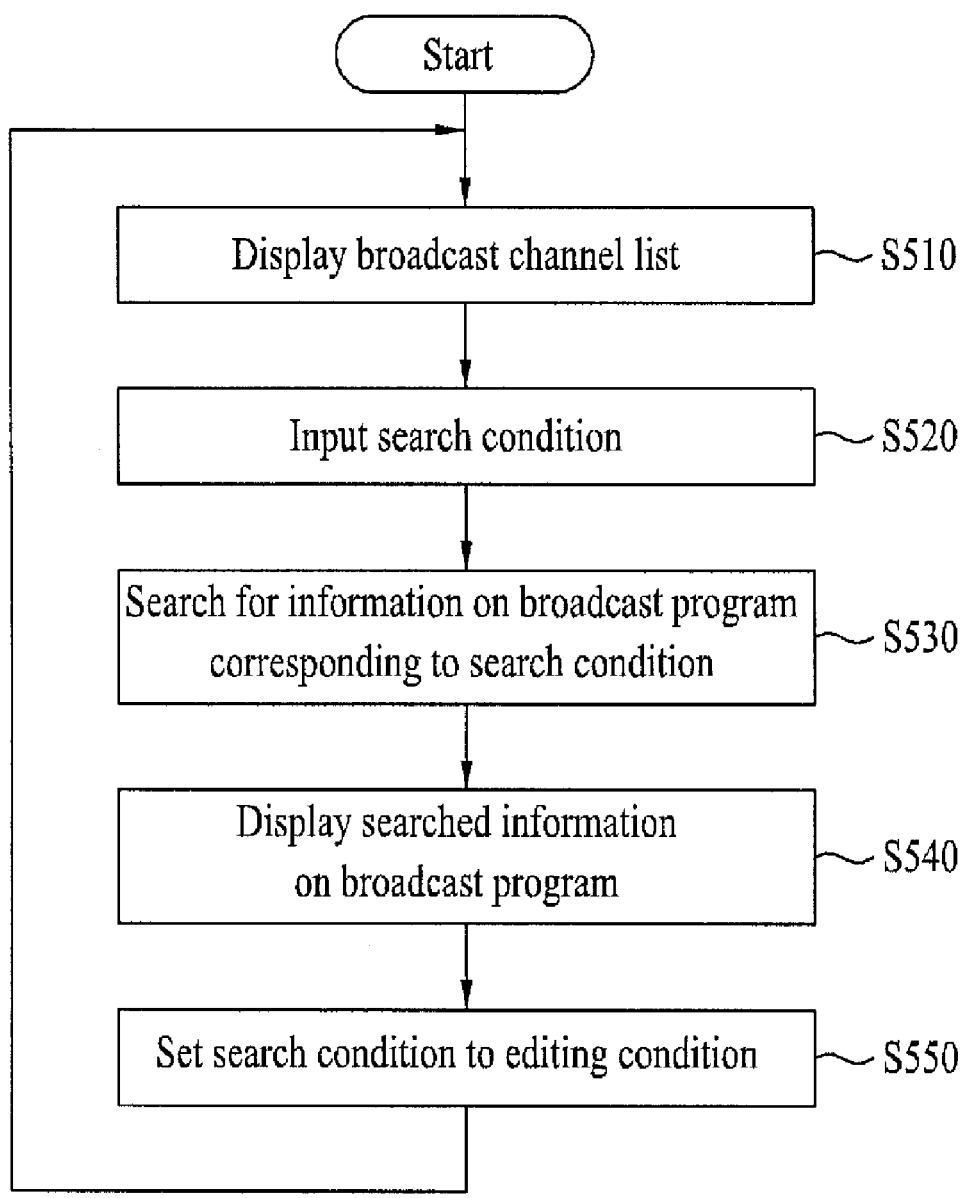
FIG. 5 is a flowchart of a method of displaying broadcast information in a mobile terminal according to one embodiment.

In the following description, a method of displaying broadcast information in a mobile terminal according to the present invention is explained in detail with reference to FIG. 5. FIG. 5 is a flowchart of a method of displaying broadcast information in a mobile terminal according to one embodiment of the present invention.

Referring to FIG. 5, the mobile terminal 100 displays a broadcast channel list via the display 151 [S501]. In this case, the broadcast channel list may include identification information on at least one broadcast channel constructing the broadcast channel list. For instance, the identification information may include channel number (e.g., CH 1, CH 2 . . . ), channel name (first channel, second channel . . . ) and the like.

The displaying step S501 may be performed if a menu item or a key (or, a key region) corresponding to a broadcast channel list displaying function is selected by a user. Alternatively, the displaying step S501 may be performed while a broadcast signal is being outputted. The mobile terminal 100 receives relevant broadcast information via the wireless communication unit 110 prior to the displaying step S501 and is then able to store the received relevant broadcast information in the memory 160. Hence, the mobile terminal 100 may generate a broadcast channel list, which will be displayed in the displaying step S501, using the stored relevant broadcast information under the control of the controller 180.

In one embodiment, the relevant broadcast information is the information on a broadcast channel or a broadcast program. The relevant broadcast information may include a broadcast channel number, a broadcast channel name, a broadcast program name, per-broadcast program synopsis information, performer information, broadcast schedule information, per-broadcast channel or program genre information, viewable age information, purchase information and the like. For instance, the relevant broadcast information may be provided in a format such as an electronic program guide, an electronic service guide, a service guide and the like.

If the relevant broadcast information is requested by the mobile terminal 100 periodically or at a random timing point, it may be provided to the mobile terminal 100 by a relevant broadcast information providing server (not shown in the drawing). Hence, the mobile terminal 100 may update the previously stored relevant broadcast information with reference to newly received relevant broadcast information.

The mobile terminal 100 receives an input of a search condition (hereinafter named 'search condition') from a user via the user input unit 130 [S520]. The inputting step S520 may be performed prior to or in the course of the displaying step S510. In one embodiment, if the inputting step S520 is performed prior to the displaying step S510, it is possible to directly perform searching and displaying steps S530 and S540, which will be explained later, by skipping the displaying step S510. For the purpose of example, brevity and convenience of description, in this disclosure, assume that the inputting step S520 is performed in response to the displaying step S510.

In such example embodiment, the search condition may include at least one of a time condition and a date condition. Moreover, the time condition may include a specific time or a specific time interval and the date condition may include a specific date or a specific data interval. The search condition in the inputting step S520 may be inputted for at least one broadcast channel included in the broadcast channel list displayed in the displaying step S510 or may be inputted for each broadcast channel included in the broadcast channel list. In the following description, a broadcast channel, for which a search condition is inputted, shall be named a search target broadcast channel.

The mobile terminal 100 searches the relevant broadcast information stored in the memory 160, and more particularly, the relevant broadcast information on the search target broadcast channel for information on a specific broadcast program (hereinafter called 'specific broadcast program information') to correspond to the search condition inputted in the inputting step S520 under the control off the controller 180 [S530].

As broadcast date information and broadcast time information of a broadcast program provided per broadcast channel are included in the relevant broadcast information, if the search condition inputted in the inputting step S520 is the time condition or the date condition, the controller 180 may search the relevant broadcast information on the search target broadcast channel for the specific broadcast program information that corresponds to the time condition or the date condition.

For instance, if the search condition is a specific time, the controller 180 may search for information on a broadcast program broadcasted at the specific time via the search target broadcast channel. Alternatively, if the search condition is a specific time interval, the controller 180 may search for information on a broadcast program broadcasted in the specific time interval via the search target broadcast channel.

Moreover, if the search condition is a specific date, the controller 180 may search for information on a broadcast program broadcasted on the specific date via the search target broadcast channel. Alternatively, if the search condition is a specific date interval, the controller 180 may search for information on a broadcast program broadcasted in the specific date interval via the search target broadcast channel.

Furthermore, if the search condition includes a specific time (or a specific time interval) and a specific date (or a specific date interval), the controller 180 may search for information on a broadcast program broadcasted at the specific time of the specific date via the search target broadcast channel.

Meanwhile, the mobile terminal 100 displays the specific broadcast program information searched in the searching step S530 via the display 151 under the control of the controller 180 [S540]. For instance, the specific program information may include a name, broadcast time, synopsis, genre and performer information of a specific broadcast program, etc.

In one embodiment, if a search condition designates a specific time, the display 151 may display remaining broadcast time information from the specific time as information on a broadcast program broadcasted at the specific time under the control of the controller 180. The mobile terminal 100 sets the search condition, which is inputted in the inputting step S520, to a broadcast channel list editing condition (hereinafter named 'editing condition') to correspond to a user operation inputted via the user input unit 130, under the control of the controller 180 [S550].

The mobile terminal 100, in one embodiment, may display a broadcast channel list edited to correspond to the editing condition set up in the setting step S540. Therefore, broadcast channel information or broadcast program information, which was edited according to the editing condition set up in the setting step S540, may be included in the broadcast channel list displayed after the setting step S540.

For instance, if an editing condition is a present time, information on a broadcast program broadcasted at the present time per broadcast channel may be included in the broadcast channel list displayed after the setting step S540. Various embodiments according to the present invention are explained in detail with reference to the accompanying drawings as follows.

Figure 6A:
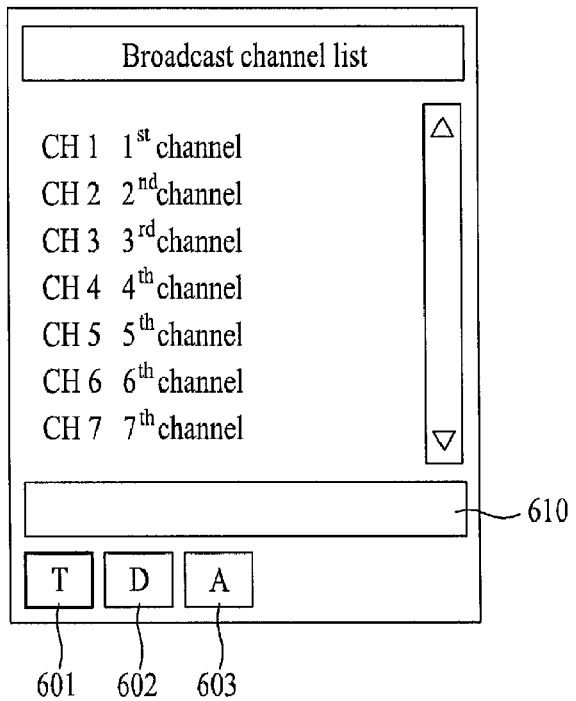
FIG. 6A and FIG. 6B are diagrams of screen configurations for receiving an input of at least one of a time condition and a date condition as a search condition according to one embodiment.
Figure 6B:
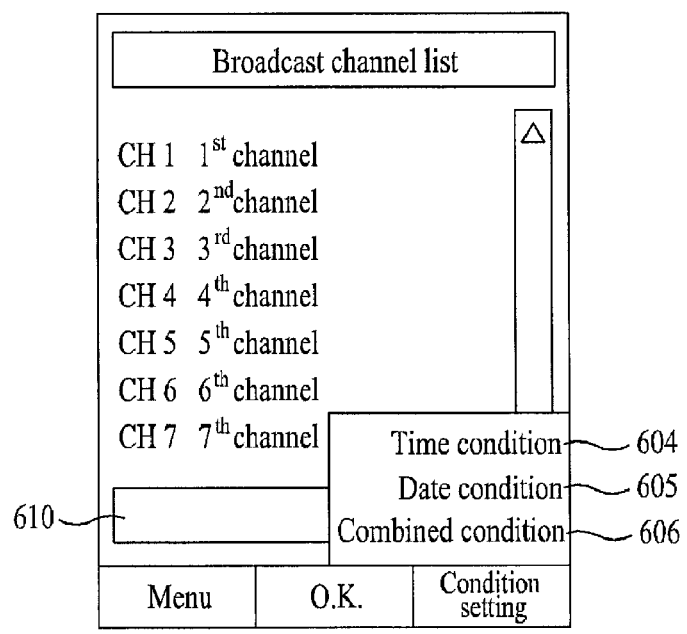

FIG. 6A and FIG. 6B are diagrams of screen configurations for receiving an input of at least one of a time condition and a date condition as a search condition according to the present invention. Referring to FIG. 6A, while a broadcast channel list is being displayed, the mobile terminal 100 may display a key region 601 for enabling a time condition input to be selected (hereinafter named 'time region'), a key region 602 for enabling a date condition input to be selected (hereinafter named 'date region') and a key region 603 for enabling a time & date condition input to be selected (hereinafter named 'combination region'). In this case, each of the key regions 601 to 603 may include an icon image, a flash image, a moving picture image or a text.

Referring to FIG. 6B, while a broadcast channel list is being displayed, if a key region for enabling a search condition input to be selected (hereinafter named 'condition setting region') is selected, the mobile terminal 100 may display a search condition list constructed with a time condition 604, a date condition 604 and a time & date combined condition 606. Hence, in case of attempting to input a time condition, a user selects the time region 601 or the time condition 604. In case of attempting to input a date condition, a user selects the date region 602 or the date condition 605. In case of attempting to input a time & date condition, a user selects the combined region 603 or the combined condition 606.

If the time region 601 or the time condition 604 is selected, the mobile terminal 100 sets a status for receiving an input of the time condition. If the date region 602 or the date condition 605 is selected, the mobile terminal 100 sets a status for receiving an input of the date condition. If the combined region 603 or the combined condition 606 is selected, the mobile terminal 100 sets a status for receiving an input of the time & date condition. In the following description, a case of selecting the time region 601, the date region 602 or the combined region 603 is explained with reference to FIG. 6A. If the time region 601 is selected, a status for receiving an input of a time condition is explained as follows.

Figure 7A:
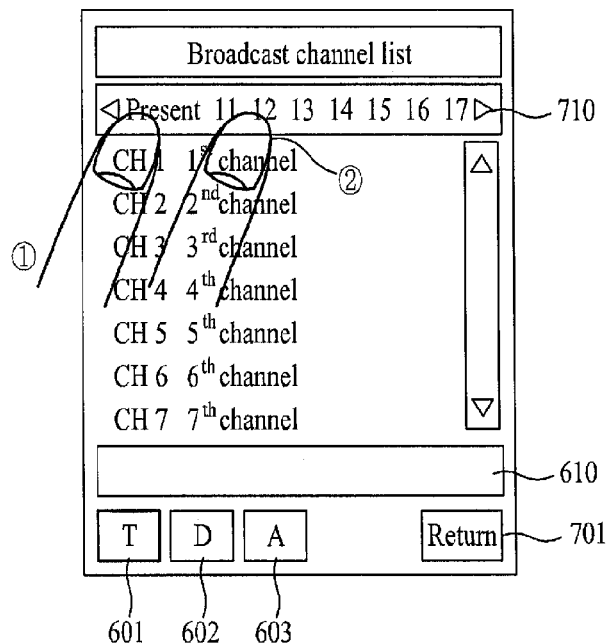
FIGS. 7A to 7C are diagrams of screen configurations for displaying information on a broadcast program broadcasted at a specific time for all broadcast channels included in a broadcast channel list according to one embodiment.
Figure 7B:
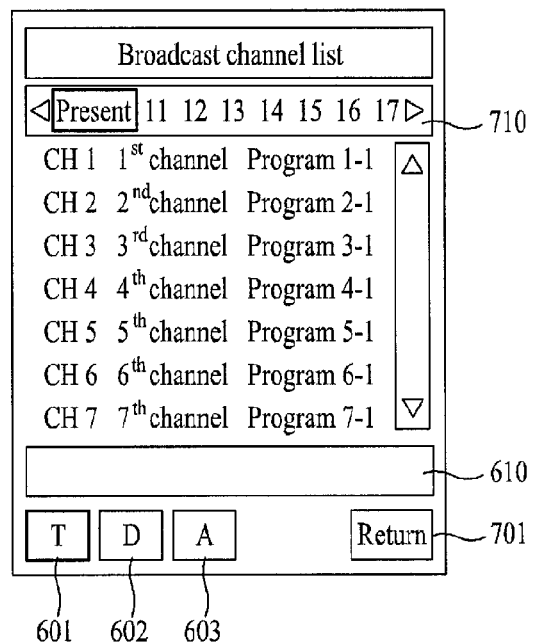
Figure 7C:
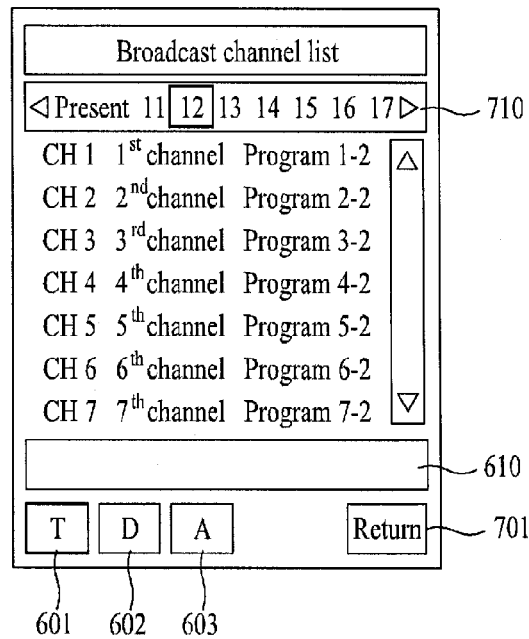

FIGS. 7A to 7C are diagrams of screen configurations for displaying information on a broadcast program broadcasted at a specific time for all broadcast channels included in a broadcast channel list according to the present invention. For the purpose of example and convenience of description, information on a broadcast program is discussed as related to the name of the broadcast program. It is noteworthy, however, that other information such as broadcast time information, synopsis information, performer information and genre information of a broadcast program may be displayed as information on the broadcast program.

Referring to FIG. 7A, the mobile terminal 100 may display a time bar 710 for enabling a user to select a specific time as a time condition. In one example, a time (e.g., 11 o'clock, 12 o'clock, 13 o'clock, . . . ), which is selectable in a predetermined time interval (e.g., 1-hour interval), may be displayed on the time bar 710. In one embodiment, a start time of the time bar 710 may be set to a present time. Occasionally, a start time of the time bar 710 may be set to a time corresponding to a past timing point. Moreover, the mobile terminal 100 may display a time list constructed with selectable time in a predetermined time interval to enable a specific time to be selected.

In case that 'present time' is selected as a specific time in FIG. 7A ①, the mobile terminal 100 sets a time condition to a present time and may display a name of a broadcast program, which is broadcasted at the present time for each broadcast channel constructing a broadcast channel list, on the broadcast channel list [FIG. 7B]. In case that '12 o'clock' is selected as a specific time in FIG. 7A ②, the mobile terminal 100 sets a time condition to 12 o'clock and may display a name of a broadcast program, which is broadcasted at 12 o'clock for each broadcast channel constructing a broadcast channel list, on the broadcast channel list [FIG. 7C].

Meanwhile, if a specific time is selected in FIG. 7A, the mobile terminal 100 sets a time condition to the selected specific time. If a specific broadcast channel is selected from a broadcast channel list, the mobile terminal 100 may display a name of a broadcast program, which is broadcasted at the specific time on the selected broadcast channel, on a separate region 610 of a screen. If 'return region' 710 is selected in FIG. 7A, FIG. 7B or FIG. 7C, the mobile terminal 100 returns to the status shown in FIG. 6A and is then able to display the broadcast channel list.

Figure 8A:
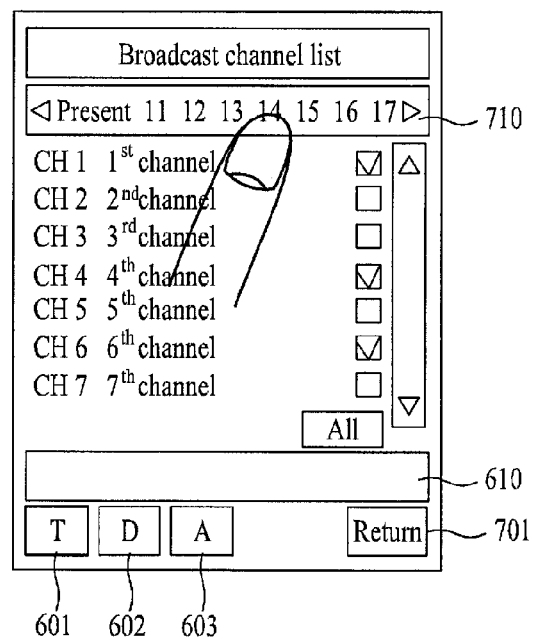
FIGS. 8A to 11B are diagrams of screen configurations for displaying information on a broadcast program broadcasted at a specific time for each broadcast channel included in a broadcast channel list according to one embodiment.
Figure 8B:
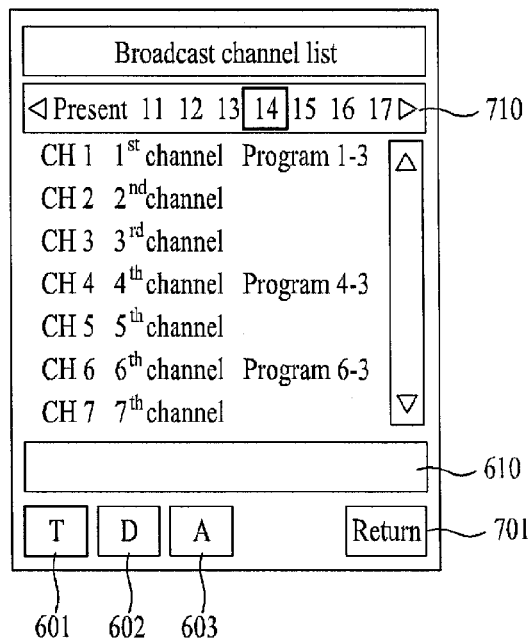

FIGS. 8A to 11B are diagrams of screen configurations for displaying information on a broadcast program broadcasted at a specific time for each broadcast channel included in a broadcast channel list according to one embodiment. Referring to FIG. 8A or FIG. 8B, a specific time may be inputted for each broadcast channel using one time bar. In one embodiment, the mobile terminal 100 displays a time bar 710 for enabling a user to select a specific time as a time condition and may display a region for selecting a search target broadcast channel per broadcast channel on a broadcast channel list [FIG. 8A].

In FIG. 8A, it may be observed that a first channel, a fourth channel and a sixth channel are selected as search target broadcast channels. Moreover, if 'all region' is selected in FIG. 8A, it is possible to call broadcast channels, which construct the broadcast channel list, as search target broadcast channel. If '14 o'clock' is selected as a specific time in FIG. 8A, the mobile terminal 100 set a time condition to 14 o'clock and may display names of broadcast programs, which are broadcasted on the first channel, the fourth channel and the sixth channel at 14 o'clock, respectively, on the broadcast channel list [FIG. 8B].

In one embodiment, the mobile terminal 100 distinguishably displays first, fourth and sixth channels as search target broadcast channels on the broadcast channel list. If a specific one of the distinguishably displayed first, fourth and sixth channels is selected, the mobile terminal 100 may display a name of a broadcast program, which is broadcasted on the selected specific broadcast channel at 14 o'clock, on a separate region 610 of a screen. If 'return region' 710 is selected in FIG. 8A or FIG. 8B, the mobile terminal 100 returns to the status shown in FIG. 6A and is then able to display the broadcast channel list.

Figure 9A:
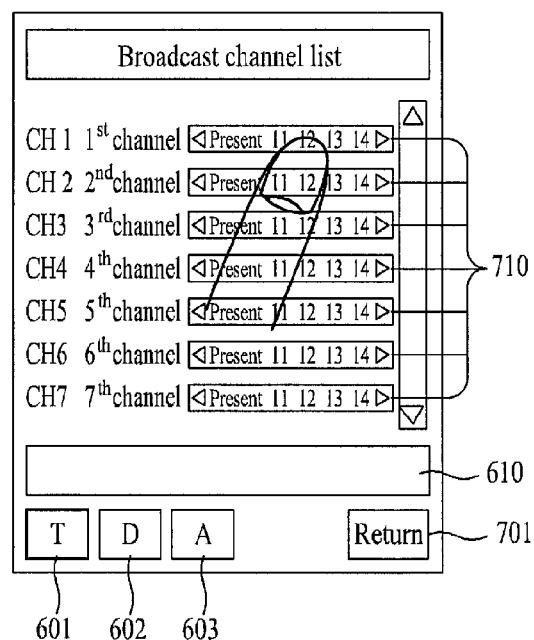
Figure 9B:
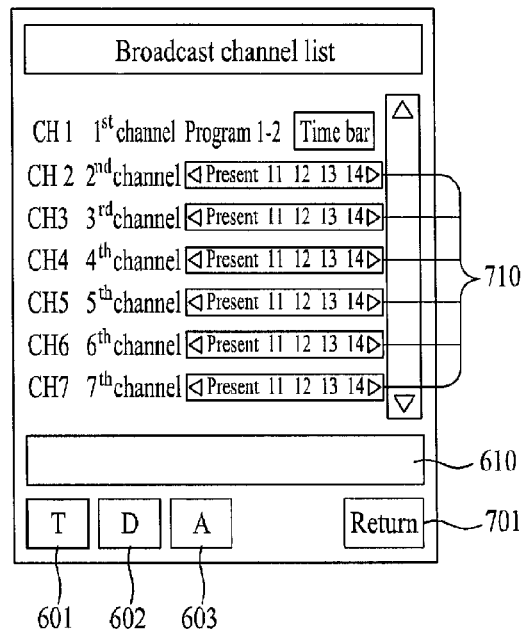
Figure 9C:
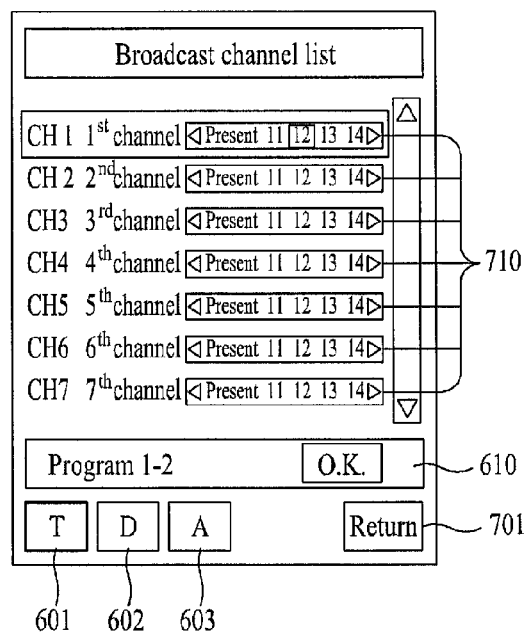

Referring to FIGS. 9A to 9C, a specific time may be inputted for each broadcast channel using a per-broadcast channel time bar. In one embodiment, the mobile terminal 100 may display a time bar 710 for enabling a user to select a specific time as a time condition for each broadcast channel constructing a broadcast channel list [FIG. 9A]. Hence, the user may select a specific time as the time condition for each broadcast channel constructing the broadcast channel list.

For the purpose of example, brevity and convenience of explanation, in the following description a specific time is discussed as inputted for a first channel shown in FIG. 9A. It is noteworthy, however, that a specific time may be inputted for each broadcast channel constructing the broadcast channel list. For example, if a specific time '12 o'clock' is selected as a time condition for the first channel in FIG. 9A, the mobile terminal 100 sets the time condition for the first channel to 12 o'clock and may display the name of a broadcast program, which is broadcasted on the first channel at 12 o'clock, on the broadcast channel list [FIG. 9B].

In FIG. 9B, the time bar 710 of the first channel is displayed as minimized. If the time bar displayed in the minimized state is selected, it is possible to display the entire time bars 710 shown in FIG. 9A. Alternatively, if a specific time '12 o'clock' is selected as a time condition for the first channel in FIG. 9A, the mobile terminal 100 sets the time condition for the first channel to 12 o'clock and may display a name of a broadcast program, which is broadcasted on the first channel at 12 o'clock, on a separate region 610 of a screen [FIG. 9C].

In FIG. 9C, a specific time may be selected by displaying the time bar 710 for the first channel as it is. If 'O.K. region' in the separate region 610 is selected, it is possible to display a broadcast program name, which is displayed on the separate region 610, on a first channel region on the broadcast channel list [also see FIG. 9B]. If 'return region' 701 is selected in one of FIGS. 9A to 9C, the mobile terminal 100 returns to the status shown in FIG. 6A and is then able to display the broadcast channel list.

Figure 10A:
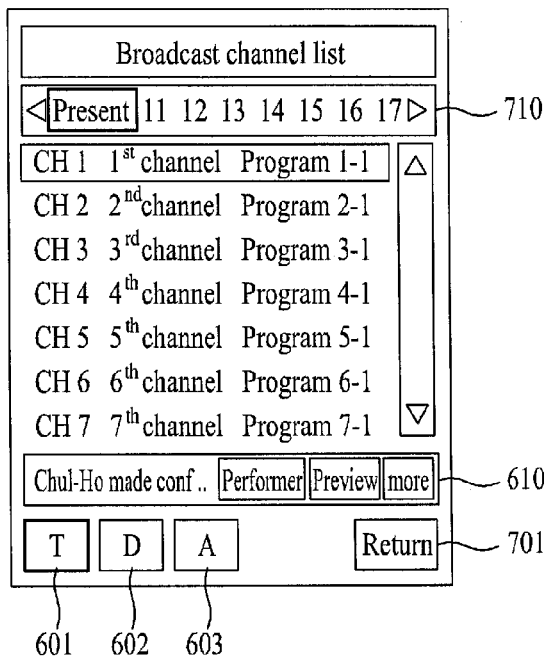
Figure 10B:
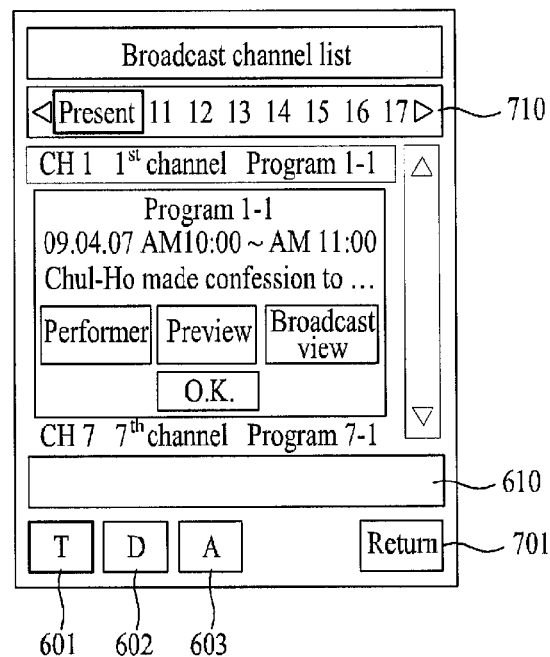

Referring to FIG. 10A and FIG. 10B, it is possible to display detailed broadcast information of a broadcast channel, for which a broadcast program name is displayed on a broadcast channel list. In one embodiment, if a specific broadcast channel (e.g., first channel) is selected by a user as shown in FIG. 7B, the mobile terminal 100 displays detailed broadcast information on a broadcast program broadcasted at that time on the specific broadcast channel on a separate region 610 [see FIG. 10A] or displays the detained broadcast information using a popup window [see FIG. 10B]. In one example, the detailed broadcast information may include a name, broadcast time information, synopsis, performer information, preview broadcast and genre information of a broadcast program.

Figure 11A:
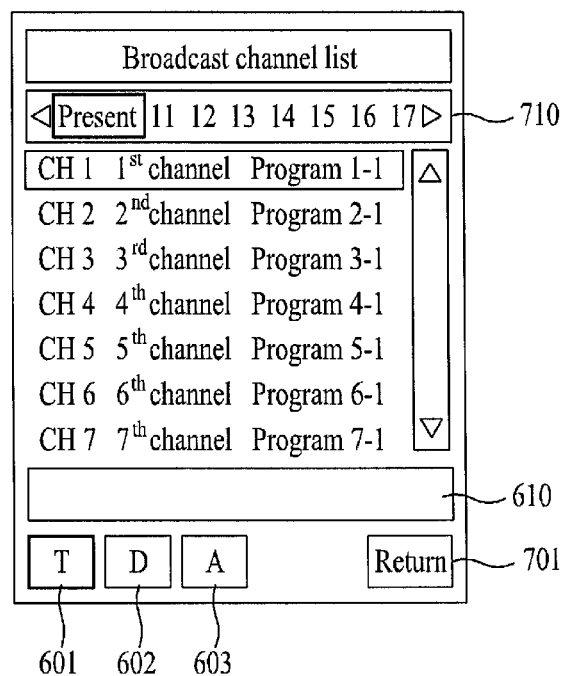
Figure 11B:

Referring to FIG. 11A and FIG. 11B, a broadcast signal of a broadcast channel, for which a broadcast program name is displayed on a broadcast channel list, may be received and outputted. In one embodiment, if a specific broadcast channel (e.g., first channel) is selected by a user in the status shown in FIG. 7B [see also FIG. 11A], the mobile terminal 100 may receive and output a broadcast signal provided on the specific broadcast channel at a present time [see FIG. 11B].

In the selection of a specific broadcast channel in the status shown in FIG. 7B, the mobile terminal 100 may identify whether the selection is made for providing detailed broadcast information or a broadcast output. For instance, the mobile terminal 100 may identify the selection by recognizing such a touch pattern to a specific broadcast channel region on a broadcast channel list as a touch count, a touch action, a touch time and the like.

FIGS. 12A to 12D are diagrams of screen configurations for displaying remaining broadcast time information from a specific time as information on a broadcast program broadcasted at a specific time according to the present invention. First of all, if a specific time is inputted as a time condition for entire broadcast channels (or, a specific one of the entire broadcast channels) constructing a broadcast channel list, the mobile terminal 100 may display broadcast program name and remaining broadcast time information, which relate to information (hereinafter named 'broadcast program information') on a broadcast program broadcasted at the specific time for each of the entire broadcast channels, on the broadcast channel list [FIG. 12A].

In displaying the remaining broadcast time information in FIG. 12A, it is possible to use a bar (hereinafter named 'broadcast progress bar') indicating a broadcast progress state. In this case, a whole bar length indicates a whole broadcast time, a colored part of the whole bar indicates a broadcasted time, and a blank part of the bar may indicate a remaining broadcast time. Moreover, as the whole bar length is equal in every broadcast channel, it is possible to display a real running time of the whole broadcast time next to the bar (e.g., CH1—60 m, CH2—2 hr, CH3—1 hr . . . ). In one embodiment, it is possible to further display a remaining broadcast time from a specific time per broadcast channel using figures (e.g., CH1—20 m, CH2—1 hr, CH3—15 m . . . ).

Figure 12A:
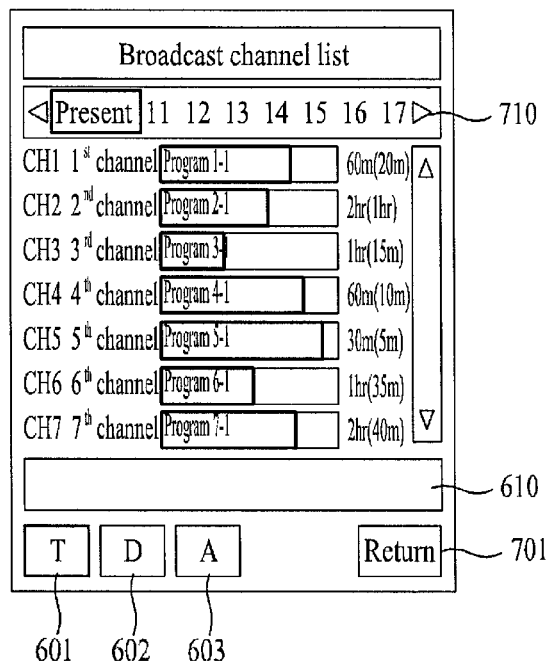
FIGS. 12A to 12D are diagrams of screen configurations for displaying remaining broadcast time information from a specific time as information on a broadcast program broadcasted at a specific time according to one embodiment.
Figure 12B:
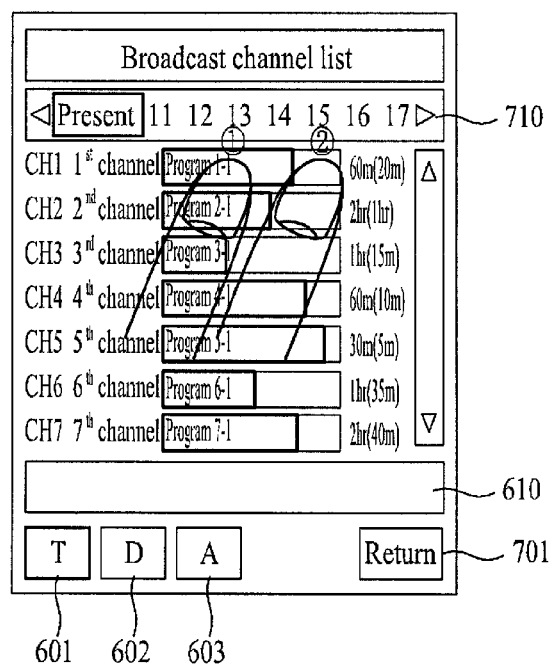
Figure 12C:
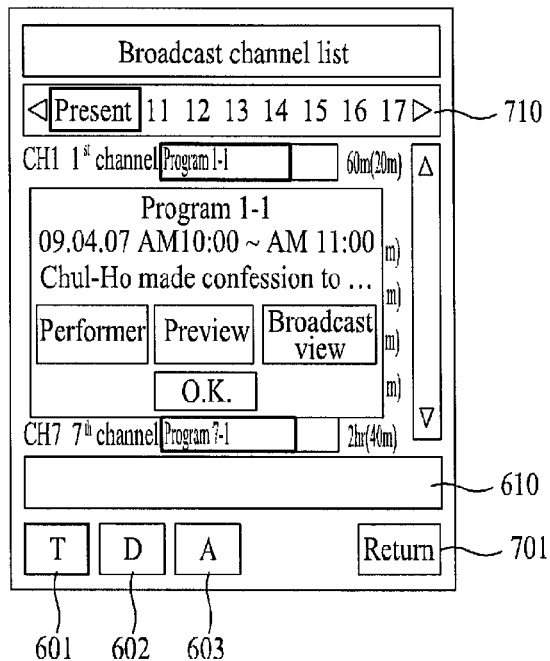
Figure 12D:
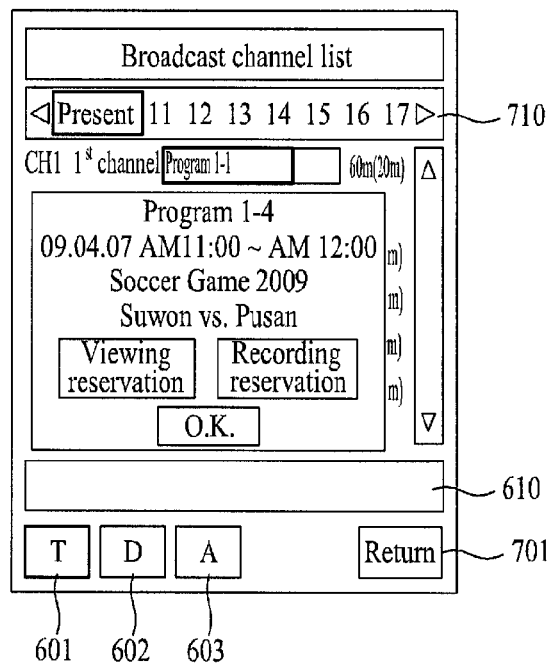

If a colored part of a broadcast progress bar of a specific channel (e.g., first channel) is selected in FIG. 12A [see also FIG. 12B], the mobile terminal 100 may display detailed broadcast information of a currently broadcasted broadcast program [FIG. 12C]. Meanwhile, if a broadcast view of a current broadcast program is selected by a user in FIG. 12C, the mobile terminal 100 may receive and output the current broadcast program. If a blank part of a broadcast progress bar of a specific channel (e.g., first channel) is selected in FIG. 12A [see also FIG. 12B], the mobile terminal 100 may display detailed broadcast information of a broadcast program that will be broadcasted right behind a currently broadcasted broadcast program [FIG. 12D]. If a setting operation of a viewing or recording reservation is inputted by a user in FIG. 12D, the mobile terminal 100 may set a viewing or recording reservation for a next broadcast program under the control of the controller 180.

FIGS. 13A to 13D are diagrams of screen configurations for displaying information on a broadcast program broadcasted in a specific time interval for all broadcast channels included in a broadcast channel list according to the present invention. For the purpose of example, brevity and convenience of description, information on a broadcast program is discussed a name and broadcast time information of the broadcast program. Of course, it is understood that broadcast time information, synopsis information, performer information and genre information of a broadcast program may be displayed as information on the broadcast program.

Figure 13A:
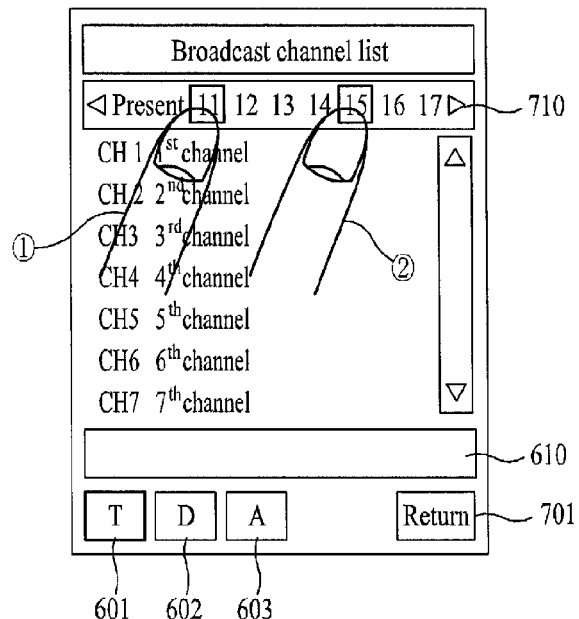
FIGS. 13A to 13D are diagrams of screen configurations for displaying information on a broadcast program broadcasted in a specific time interval for all broadcast channels included in a broadcast channel list according to one embodiment.

Referring to FIG. 13A, the mobile terminal 100 may display a time bar 710 for enabling a user to select a specific time interval as a time condition. If '11 o'clock ①' and '15 o'clock ②' are selected as start and end times of a specific time interval in FIG. 13A, respectively, the mobile terminal 100 may set a time condition to a time interval between 11 o'clock and 15 o'clock. The mobile terminal 100 may display a name and broadcast time of a broadcast program, which is broadcasted during the set time interval (e.g., 11 o'clock to 15 o'clock) for every single broadcast channel constructing a broadcast channel list, on the broadcast channel list [FIG. 13B].

Figure 13B:
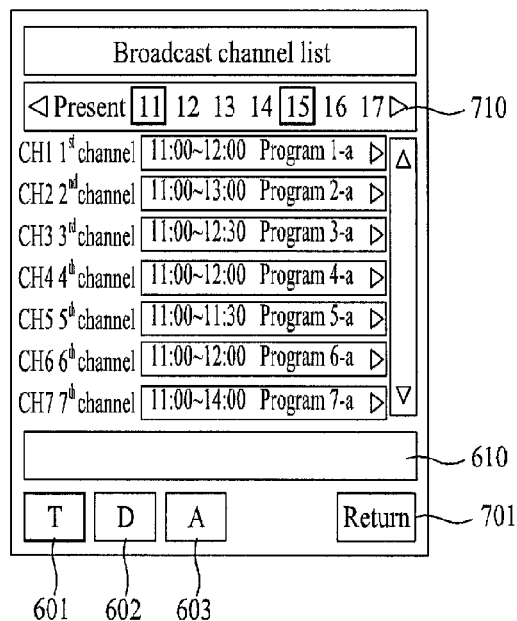
Figure 13C:
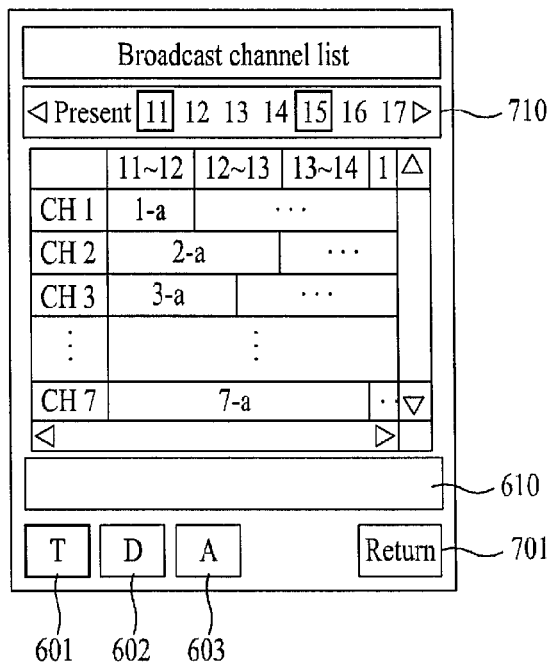

In FIG. 13B, it is possible to display a name of a broadcast program per broadcast channel in order of broadcast time. In this case, if a direction key is manipulated by a user or a name display region is scrolled by the user, it is possible to display a name of a broadcast program before or after the corresponding order. Alternatively, the mobile terminal 100 may display a name of a broadcast program, which is broadcasted during the set time interval (e.g., 11 o'clock to 15 o'clock) for every single broadcast channel constructing a broadcast channel list, in format of a broadcast programming table (e.g., vertical: broadcast channel, horizontal: broadcast time) on the broadcast channel list [FIG. 13C]. For instance, the broadcast programming table may be displayed as a popup window.

Figure 13D:
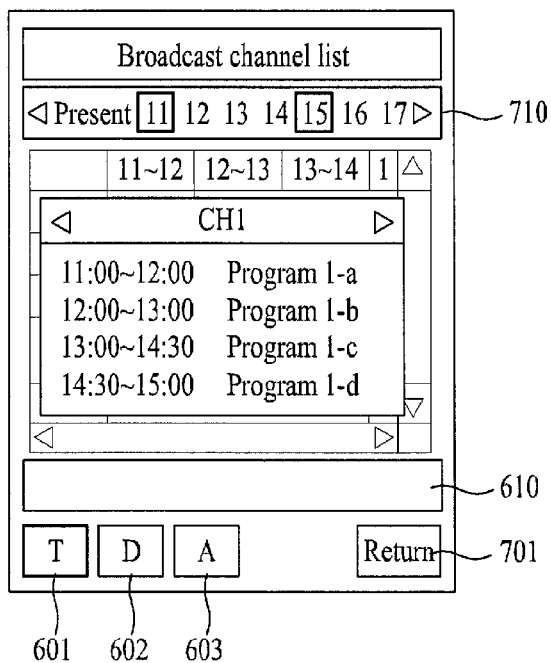

Alternatively, the mobile terminal 100 may display a name and broadcast time of a broadcast program, which is broadcasted during the set time interval (11 o'clock to 15 o'clock) for a user-selected one of entire broadcast channels constructing a broadcast channel list, in a format of popup window [FIG. 13D]. In one embodiment, a user may select a broadcast channel by manipulating a direction key.

In an exemplary embodiment, if a specific time interval is selected in FIG. 13A, the mobile terminal 100 sets a time condition to the selected specific time interval. If a specific broadcast channel is selected from a broadcast channel list, the mobile terminal 100 may display a name and broadcast time of a broadcast program, which is broadcasted in the specific time interval on the selected broadcast channel, on a separate region 610 of a screen. If 'return region' 701 is selected in one of FIGS. 13A to 13D, the mobile terminal 100 returns to the status shown in FIG. 6A and is then able to display the broadcast channel list.

FIGS. 14A to 15D are diagrams of screen configurations for displaying information on a broadcast program broadcasted in a specific time interval for each broadcast channel included in a broadcast channel list according to the present invention. For the purpose of example, brevity and convenience of description, information on a broadcast program refers to a name and broadcast time information of the broadcast program. It is noteworthy, however, that said information may also include broadcast time information, synopsis information, performer information and genre information of a broadcast program as displayed as information on the broadcast program.

Figure 14A:
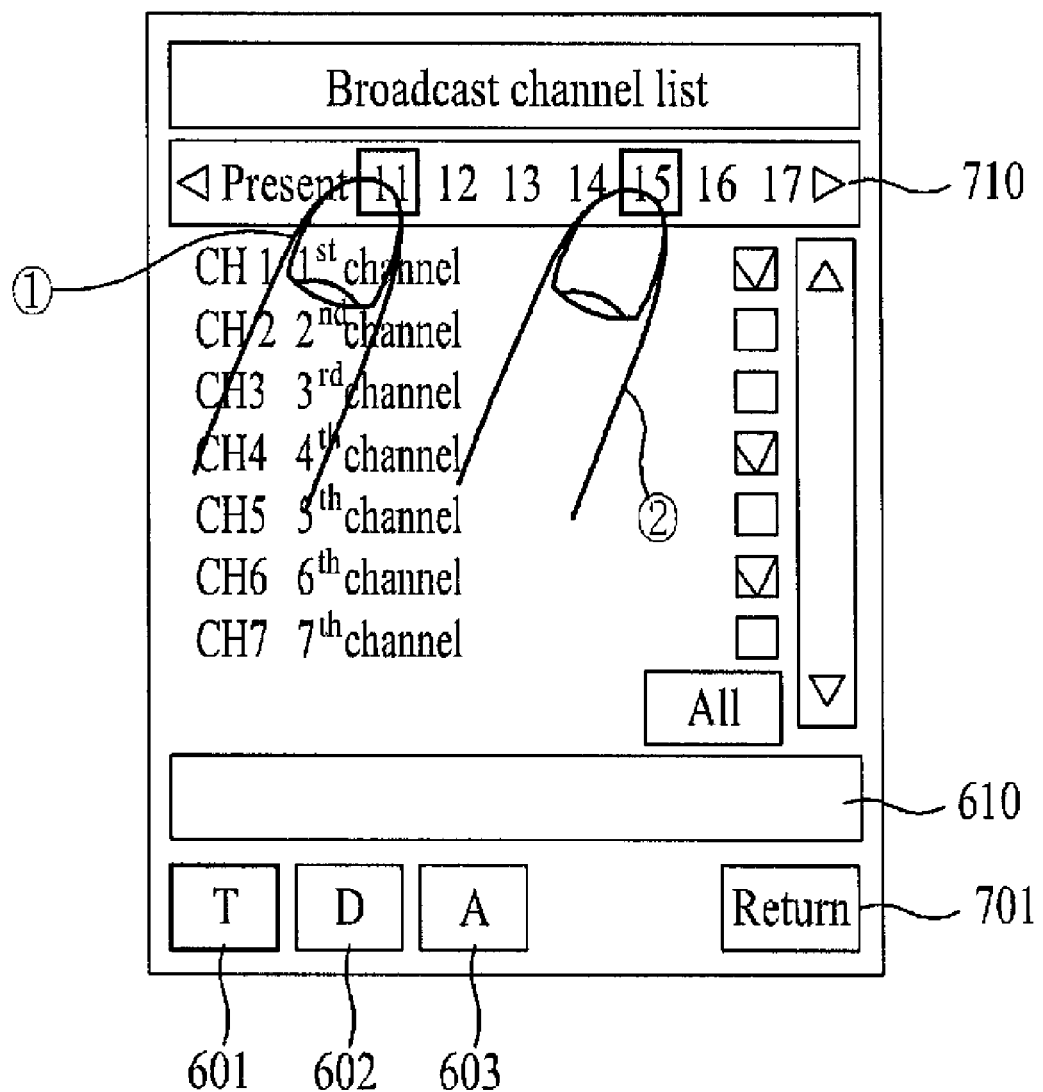
FIGS. 14A to 15D are diagrams of screen configurations for displaying information on a broadcast program broadcasted in a specific time interval for each broadcast channel included in a broadcast channel list according to one embodiment.
Figure 14B:
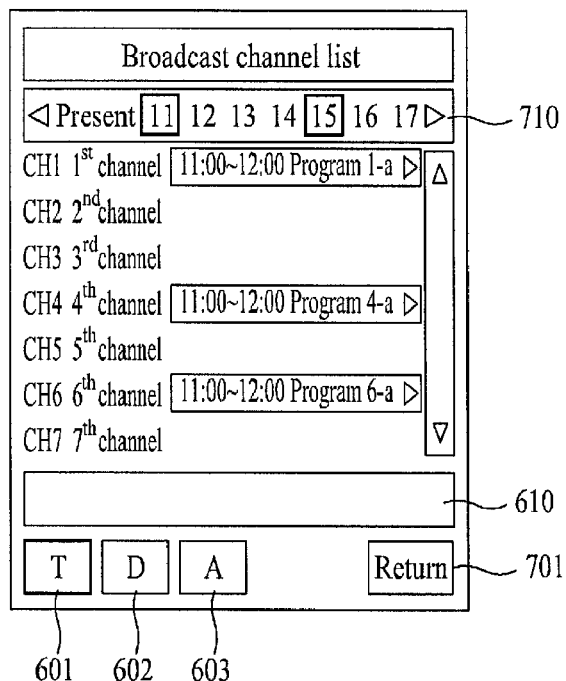
Figure 14B:
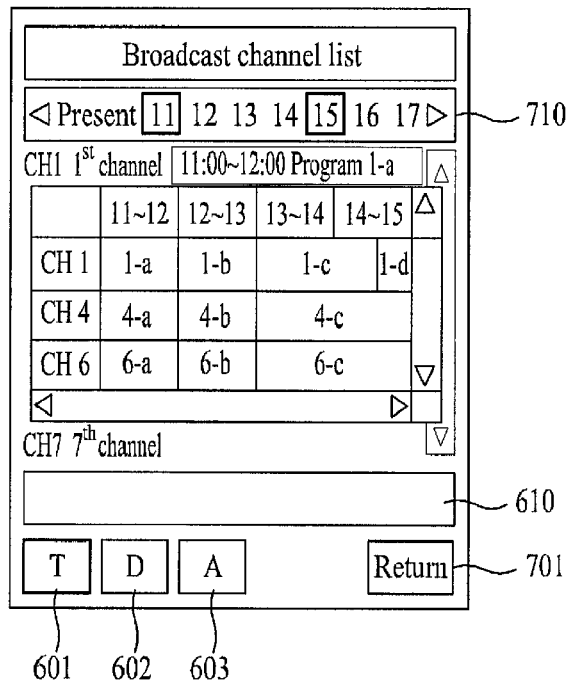

Referring to FIG. 14A and FIG. 14B, a specific time interval may be inputted for each broadcast channel using one time bar. In one embodiment, the mobile terminal 100 displays a time bar 710 for enabling a user to select a specific time interval as a time condition and is then able to display a region for enabling the user to select a search target broadcast channel per broadcast channel on a broadcast channel list [FIG. 14A].

If, for example, '11 o'clock to 15 o'clock' is selected as a specific time interval in FIG. 14A, the mobile terminal set a time condition to a time interval between 11 o'clock and 15 o'clock and is then able to display a name and broadcast time of a broadcast program broadcasted between 11 o'clock to 15 o'clock for each of first, fourth and sixth channels selected as search target broadcast channels [FIG. 14B].

In one embodiment, the mobile terminal 100 displays names and broadcast time of broadcast programs broadcasted between 11 o'clock and 15 o'clock on the first, fourth and sixth channels on a broadcast channel list [(a) of FIG. 14B] or may display them in format of a broadcast programming table [(b) of FIG. 14B]. The mobile terminal 100 may, in a distinctive way, display the first, fourth and sixth channels corresponding to the search target broadcast channels on the broadcast channel list. If a specific broadcast channel is selected from the first, fourth and sixth channels, the mobile terminal 100 may display a name and broadcast time of the broadcast program, which is broadcasted on the selected specific broadcast channel between 11 o'clock and 15 o'clock, on a separate region 610 of a screen. If 'return region' 701 is selected in one of FIG. 14A and FIG. 14B, the mobile terminal 100 returns to the status shown in FIG. 6A and is then able to display the broadcast channel list.

Referring to FIGS. 15A to 15D, a specific time may be inputted for each broadcast channel using a per-broadcast channel time bar. In one embodiment, the mobile terminal 100 may display a time bar 710 for enabling a user to select a specific time interval for every single broadcast channel constructing a broadcast channel list [FIG. 15A]. Hence, the user may select a specific time interval as a time condition for each broadcast channel constructing the broadcast channel list.

Figure 15A:
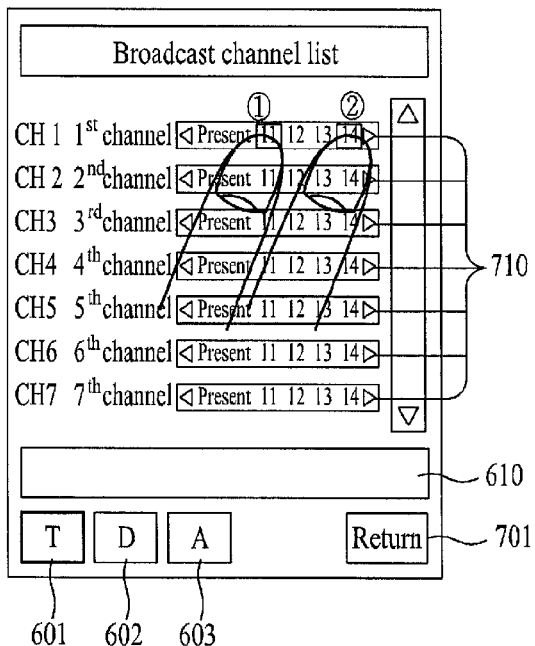

For the purpose of example, brevity and convenience of explanation, the following description refers to a case that a specific time interval is inputted for a first channel in FIG. 15A. It is noteworthy, however, that a specific time interval may be inputted for every single broadcast channel constructing the broadcast channel list. If a time interval between, for example, 11 o'clock and 14 o'clock is selected as a time condition for a first channel in FIG. 15A, the mobile terminal 100 may set a time condition for the first channel to the time interval between 11 o'clock and 14 o'clock, for example.

Figure 15B:
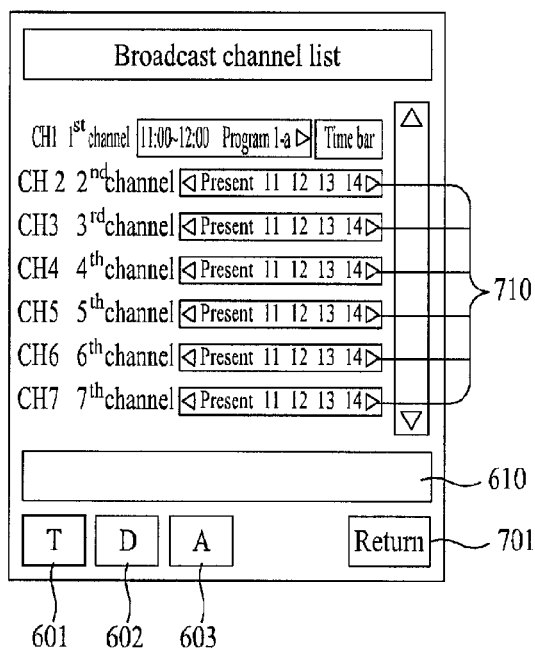

Subsequently, the mobile terminal 100 may display a name and broadcast time of a broadcast program, which is broadcasted on the first channel between 11 o'clock and 14 o'clock, for example, on a broadcast channel list [FIG. 15B]. In FIG. 15B, the mobile terminal 100 displays a time bar 710 of the first channel in a minimized mode. If the time bar displayed in the minimized mode is selected, the mobile terminal 100 may display a whole time bar 710 shown in FIG. 15A.

Figure 15C:
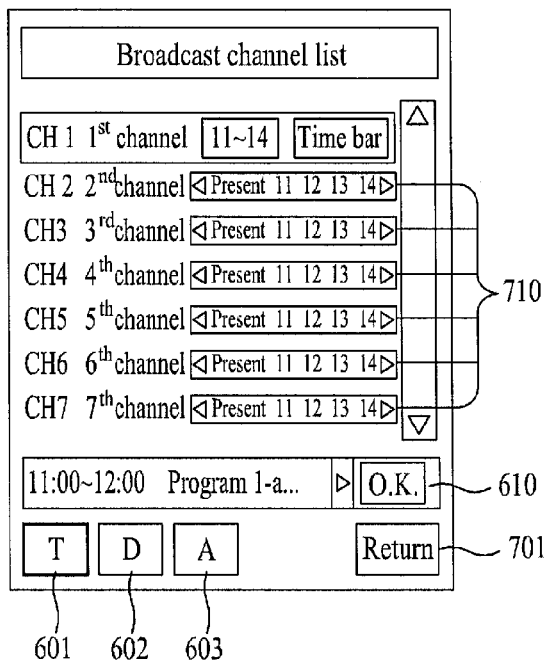

In one embodiment, the mobile terminal 100 may display a name and broadcast time of a broadcast program, which is broadcasted on the first channel between 11 o'clock and 14 o'clock, on a separate region 610 of the screen [FIG. 15C]. In FIG. 15C, a specific time interval may be reselected by displaying the time bar 710 for the first channel as it is. If 'O.K. region' is selected from the separate region 610, the mobile terminal 100 may display the name and broadcast time of the broadcast program, which is displayed on the separate region 610, on a first channel region on the broadcast channel list [cf. FIG. 15B].

Figure 15D:
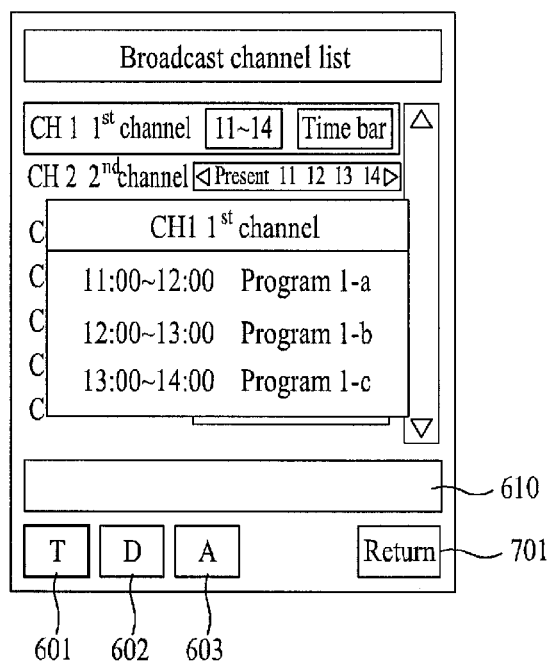
Figure 16A:
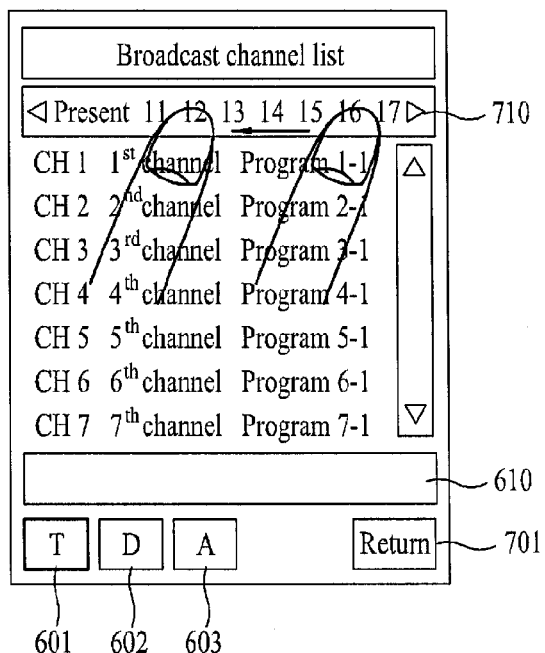
FIGS. 16A to 17B are diagrams of screen configurations for displaying that a time bar for receiving an input of a time condition according to one embodiment.
Figure 16B:
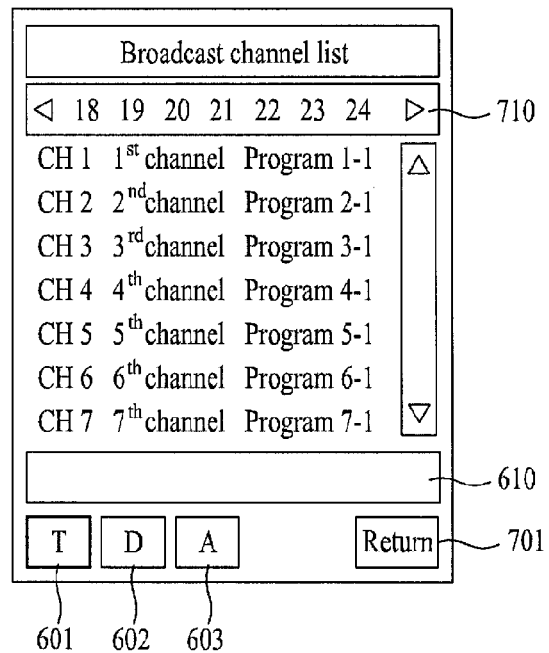

In one embodiment, the mobile terminal 100 may display a name and broadcast time of a broadcast program, which is broadcasted on the first channel between 11 o'clock and 14 o'clock, in a format of a popup window [FIG. 15D]. If 'return region' 701 is selected as shown in one of FIGS. 15A to 15D, the mobile terminal 100 returns to the status shown in FIG. 6A and is then able to display the broadcast channel list. Besides, it is possible to display detailed broadcast information of a search target broadcast channel for which a name and broadcast time of a broadcast program broadcasted or a specific time interval [not shown in the drawings].

For instance, after a specific broadcast channel has been selected from search target broadcast channels by a user, if a specific broadcast program is selected from a plurality of broadcast programs broadcasted on the selected specific broadcast channel in a specific time interval, when the selected broadcast program is currently broadcasted, the mobile terminal 100 outputs the selected specific broadcast program. If the selected specific broadcast program is supposed to be broadcasted in the future, the mobile terminal 100 may make a viewing or recording reservation for the selected broadcast program.

FIGS. 16A to 17B are diagrams of screen configurations for displaying that a time bar for receiving an input of a time condition of the present invention is shifted. This embodiment with reference to FIGS. 16A to 17B is applicable to all time bars appearing in this disclosure or the drawings attached thereto. If a user inputs a touch & drag action from a first point to a second point of a time bar 710 [FIG. 16A], the mobile terminal 100 may scroll a time displayed on the time bar 710 to correspond to the inputted touch & drag action [FIG. 16B]. In this case, a scroll distance/speed may be proportional to a touch & drag distance/speed and a scroll direction may match a touch & drag direction.

For instance, while a time interval between a present time and 17 o'clock is displayed on the time bar 710 in 1-hour interval, if a touch & drag action of a predetermined distance is inputted, it is possible to scroll the time displayed on the time bar 710 in a prescribed direction to correspond to the predetermined distance. Meanwhile it is possible to scroll the time displayed on the time bar 710 by manipulating a direction key provided to right and left sides of the time bar 710.

Figure 17A:
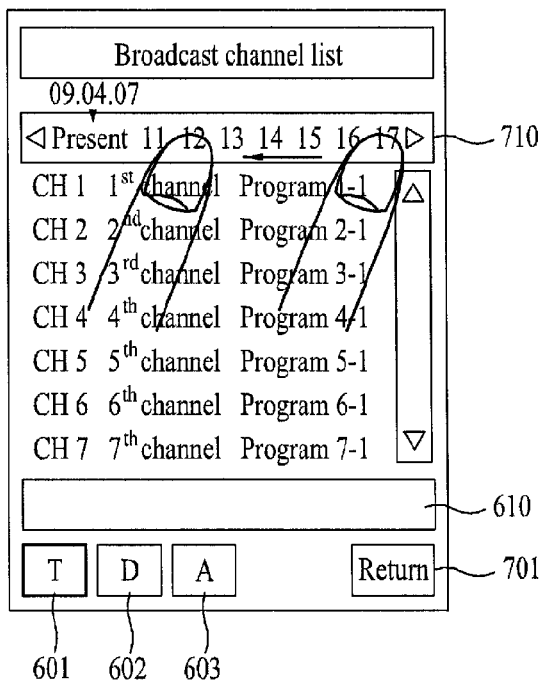
Figure 17B:
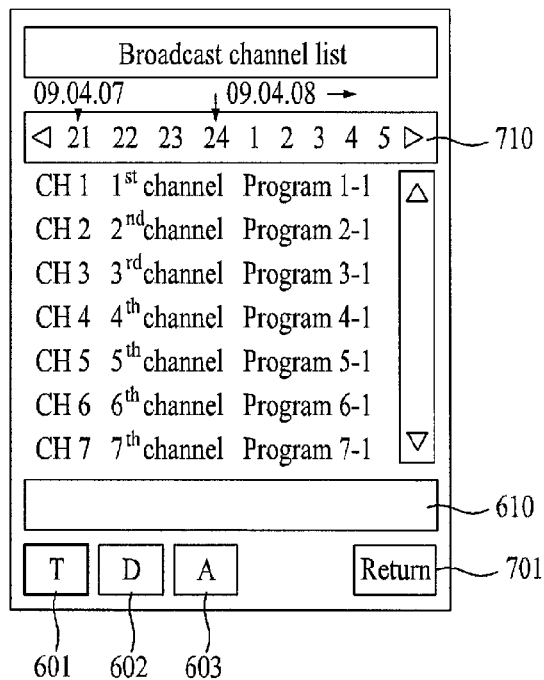

As the time bar 710 is scrolled, if times ranging today to tomorrow or yesterday to today are displayed on the time bar 710, the mobile terminal 100 may display dates on the time bar 710 together with the times [FIG. 17A and FIG. 17B]. In the following description, a status for inputting a date condition according to a selection of a date region 602 is explained.

Figure 18:
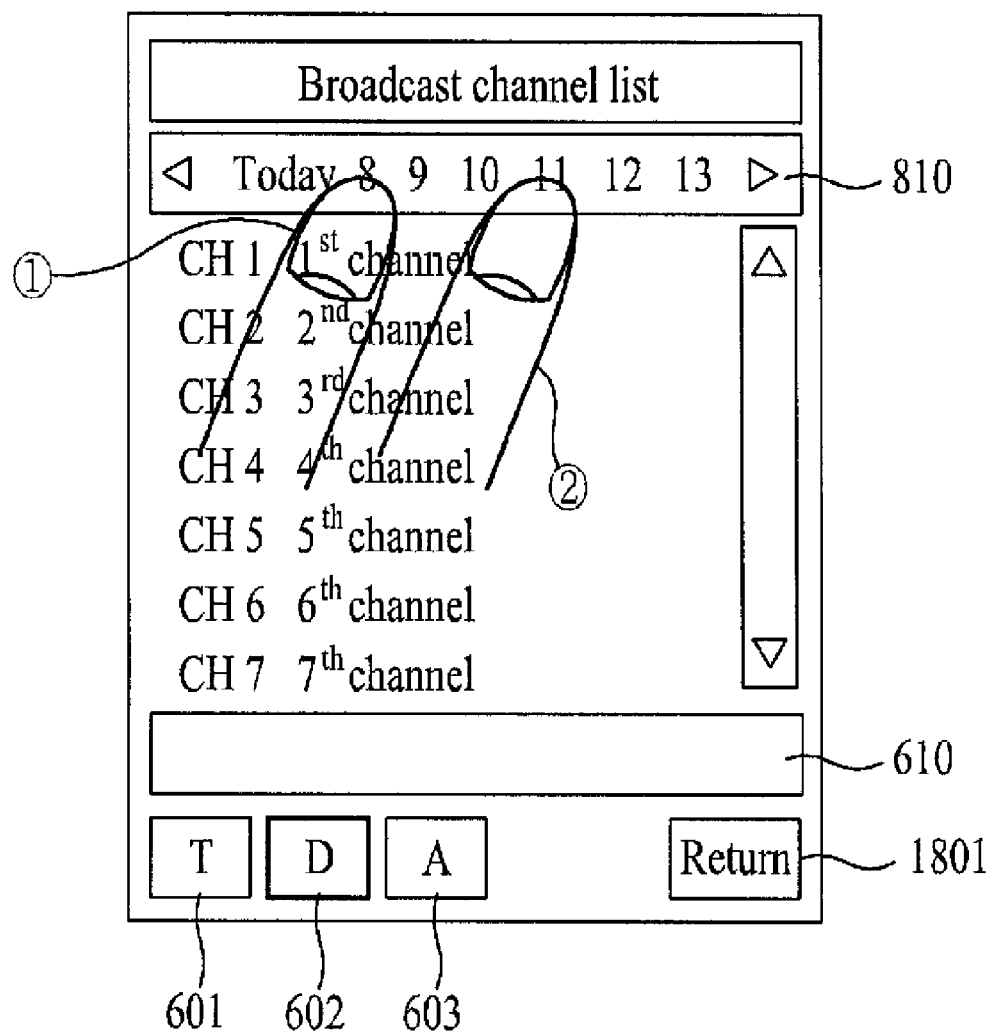
FIGS. 18 to 19B are diagrams of screen configurations for displaying information on a broadcast program broadcasted on a specific date or in a specific time interval for all broadcast channels included in a broadcast channel list according to one embodiment.
Figure 19A:
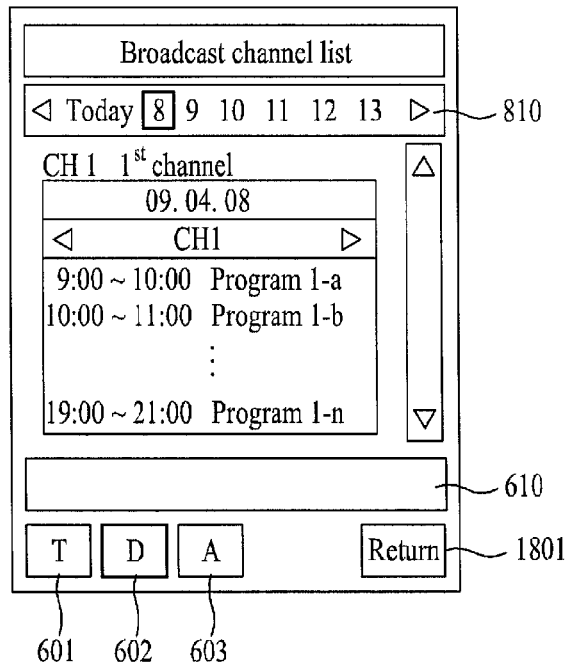
Figure 19B:
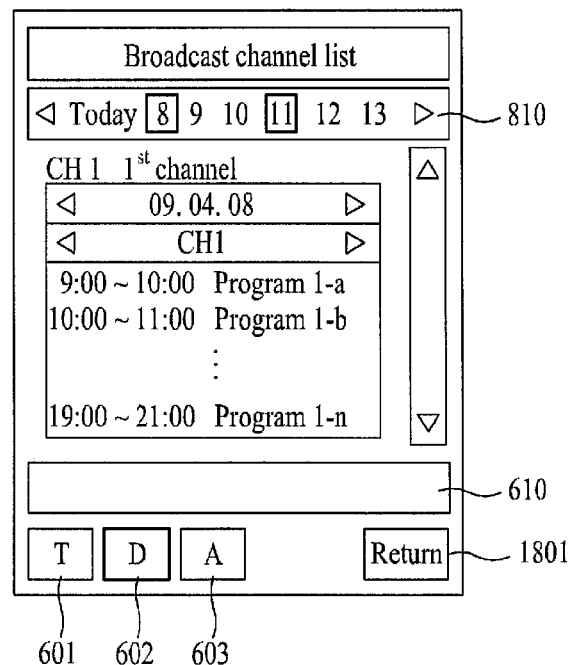

FIGS. 18 to 19B are diagrams of screen configurations for displaying information on a broadcast program broadcasted on a specific date or in a specific time interval for all broadcast channels included in a broadcast channel list according to the present invention. Referring to FIG. 18, the mobile terminal 100 may display a date bar 810 for enabling a user to select a specific date or a specific date interval as a date condition.

In one embodiment, dates (e.g., $8^{th}$ day, $9^{th}$ day, $10^{th}$ day, etc.) selectable in a predetermined date interval (e.g., 1-day interval) may be displayed on the date bar 810. And, it is possible to set a start date of the date bar 810 to a date of today. Occasionally, a start date of the date bar 810 may be set to a past date. In order for a specific date or a specific $^d$ate int$^{er}$val to b$^e$ selected, the mobile terminal 100 may display a date list constructed with dates selectable in a predetermined date interval or a calendar image.

If, for example, April 8 is selected as a specific date in FIG. 18, the mobile terminal 100 sets a date condition to April 8 and may display information (e.g., broadcast time, broadcast program name, etc.) on a broadcast program broadcasted on April 8 per broadcast channel [FIG. 19A]. If a direction key manipulation for selecting a broadcast channel is inputted by a user in FIG. 19A, a broadcast channel is selected to correspond to the direction key manipulation and the information on the broadcast program provided on the selected broadcast channel on April 8 may be then displayed.

If an interval between April 8 and April 11 is selected as a specific date interval in FIG. 18, the mobile terminal 100 sets a date condition to a date interval between April 8 and April 11 and is then able to display information (e.g., broadcast time and broadcast program name) on a broadcast program broadcasted between April 8 and April 11 per broadcast channel [FIG. 19B].

If a direction key manipulation for selecting a specific date belonging to a date interval and a broadcast channel is inputted by a user in FIG. 19B, the specific date and the broadcast channel are selected to correspond to the direction key manipulation and the information on the broadcast program provided on the selected broadcast channel on the selected specific date may be then displayed. If 'return region' 1801 is selected in one of FIG. 19A or FIG. 19B, the mobile terminal 100 returns to the status shown in FIG. 6A and is then able to display the broadcast channel list.

Figure 20A:
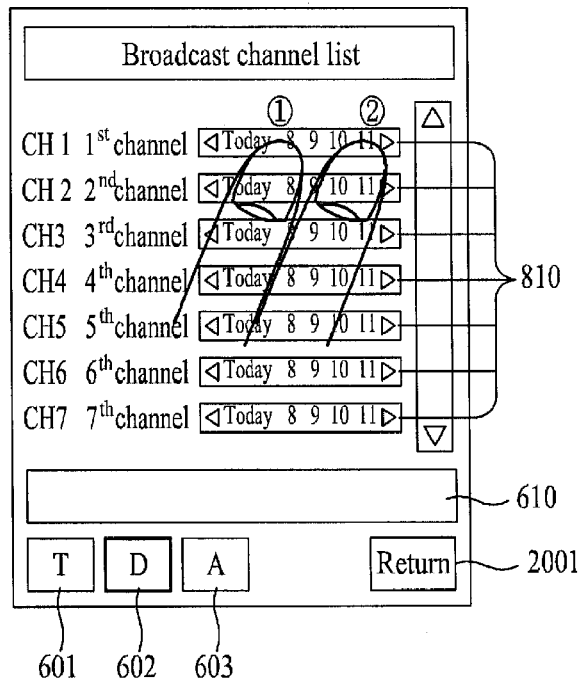
FIG. 20A and FIG. 20B are diagrams of screen configurations for displaying information on a broadcast program broadcasted on a specific date or in a specific time interval for each broadcast channel included in a broadcast channel list according to one embodiment.
Figure 20B:
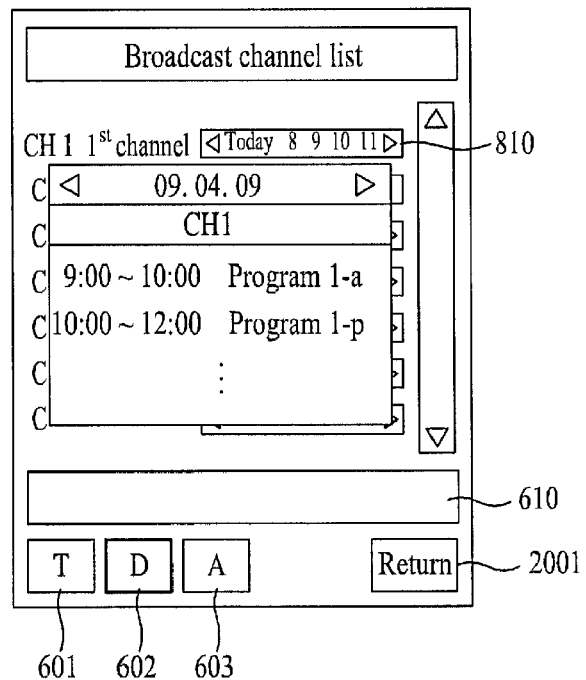

FIG. 20A and FIG. 20B are diagrams of screen configurations for displaying information on a broadcast program broadcasted on a specific date or in a specific time interval for each broadcast channel included in a broadcast channel list according to the present invention. Referring to FIG. 20A, the mobile terminal 100 may display a date bar 810 for enabling a user to select a specific date interval (or a specific date) for each broadcast channel constructing a broadcast channel list [FIG. 20A].

In one embodiment, if a date interval between April 9 and April 11 is selected as a date condition for a first channel in FIG. 20A, the mobile terminal sets the date condition for the first channel to the date interval between April 9 and April 11 and is then able to display information (e.g., broadcast time and broadcast program name) on a broadcast program broadcasted for the date interval between April 9 and April 11 on the first channel [FIG. 20B]. If 'return region' 2001 is selected in one of FIG. 20A or FIG. 20B, the mobile terminal 100 returns to the status shown in FIG. 6A and is then able to display the broadcast channel list.

In FIG. 19A, FIG. 19B or FIG. 20B, the information on the broadcast program may be displayed on a popup window or a new screen. Besides, the information on the broadcast program shown in FIG. 19A, FIG. 19B or FIG. 20B may be displayed in a format of a broadcast programming table [not shown in the drawing]. Optionally, after each search target broadcast channel has been selected, the mobile terminal may receive an input of a date condition for the selected search target broadcast channel using one date bar [not shown in the drawing]. In the following description, a mode for receiving inputs of a time condition and a date condition according to a selection of the combined region 603 is explained.

Figure 21A:
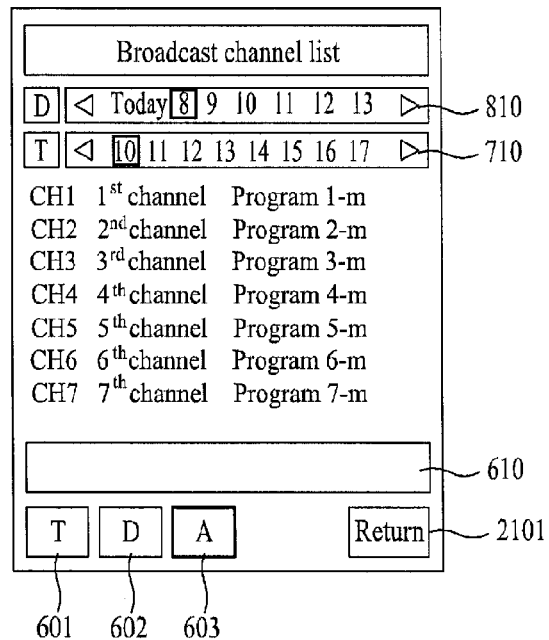
FIG. 21A and FIG. 21B are diagrams of screen configurations for displaying information on a broadcast program corresponding to a date condition and a time condition for all broadcast channels included in a broadcast channel list according to one embodiment.
Figure 21B:
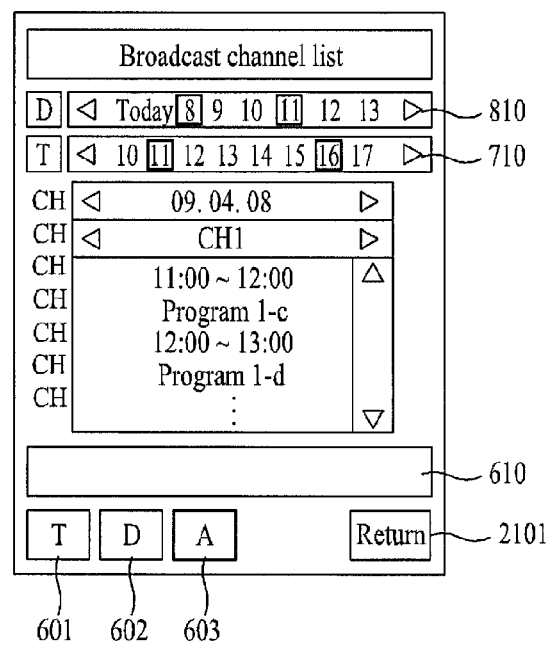

FIG. 21A and FIG. 21B are diagrams of screen configurations for displaying information on a broadcast program corresponding to a date condition and a time condition for all broadcast channels included in a broadcast channel list according to the present invention. Referring to FIG. 21A and FIG. 21B, the mobile terminal 100 displays a time bar 710 and a date bar 810 and is then able to receive an input of a time condition and an input of a date condition using the displayed time bar 710 and the displayed date bar 810, respectively.

In one embodiment, referring to FIG. 21A, if a specific date (April 8) of a date condition and a specific time (10 o'clock) of a time condition are inputted, it is possible to display information (e.g., broadcast program name) on a broadcast program broadcasted at 10 o'clock on April 8 on broadcast channel(s) (or a specific broadcast channel selected by a user) constructing a broadcast channel list.

In one embodiment, referring to FIG. 21B, if a specific date interval (between April 8 and April 11) of a date condition and a specific time interval (between 11 o'clock and 16 o'clock) of a time condition are inputted, it is possible to display information (e.g., broadcast program name) on a broadcast program broadcasted for the time interval between 11 o'clock and 16 o'clock for the date interval between April 8 and April 11 on broadcast channel(s) (or a specific broadcast channel selected by a user) constructing a broadcast channel list.

Figure 22A:
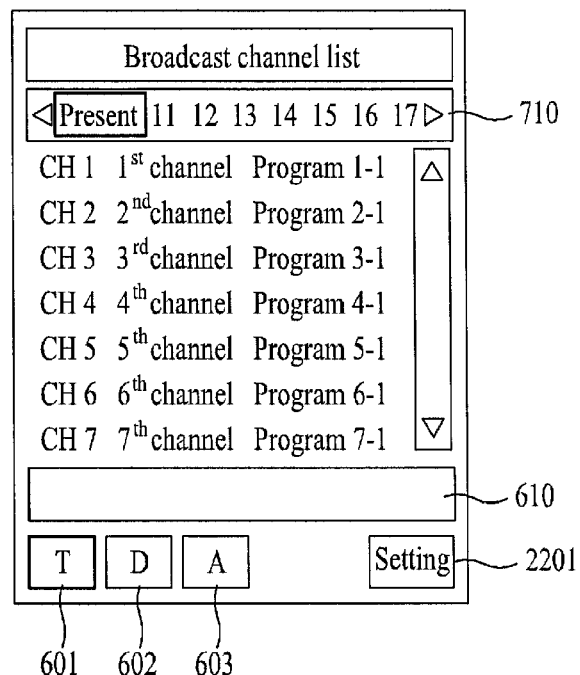
FIG. 22A and FIG. 22B are diagrams of screen configurations for setting a search condition to an editing condition according to one embodiment.
Figure 22B:
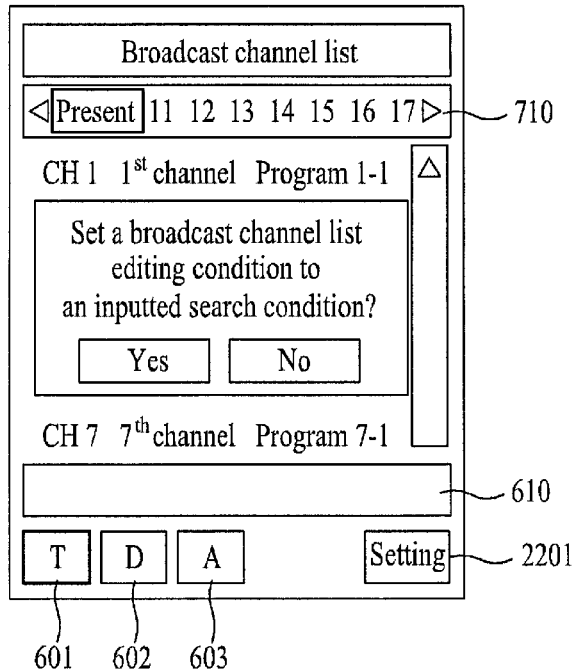

In FIG. 21B, it is possible to select a specific date belonging to a specific date interval to correspond to the user's direction key manipulation. And, it is possible to select a specific channel from a plurality of broadcast channels constructing the broadcast channel list to correspond to the user's direction key manipulation. FIG. 22A and FIG. 22B are diagrams of screen configurations for setting a search condition to an editing condition according to the present invention. First of all, while broadcast program information searched to correspond to a search condition (e.g., a time condition, a date condition, etc.) is displayed, if a setting region 2201 is selected [FIG. 21A], the mobile terminal 100 may output a text enabling a user to select whether to set the search condition to an editing condition of a broadcast channel list [FIG. 22B]. If a setting ('yes') is selected in FIG. 22B, the mobile terminal 100 may set the search condition to the editing condition.

Figure 23A:
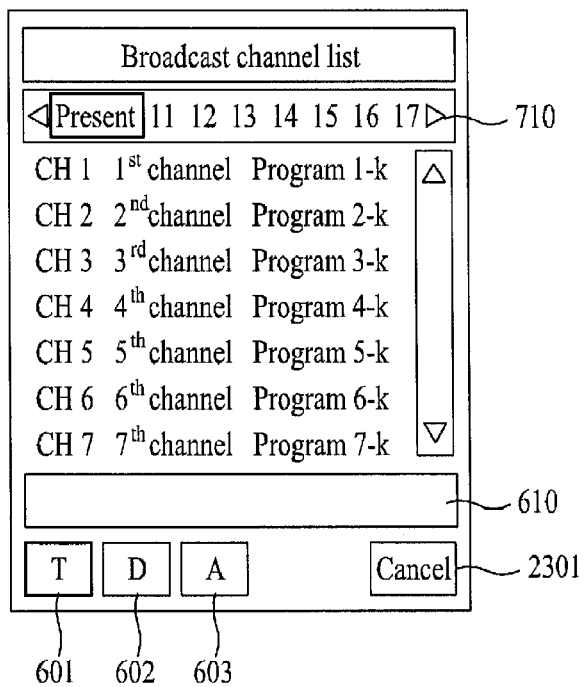
FIG. 23A and FIG. 23B are diagrams of screen configurations for displaying a broadcast channel list edited according to an editing condition according to one embodiment.
Figure 23B:
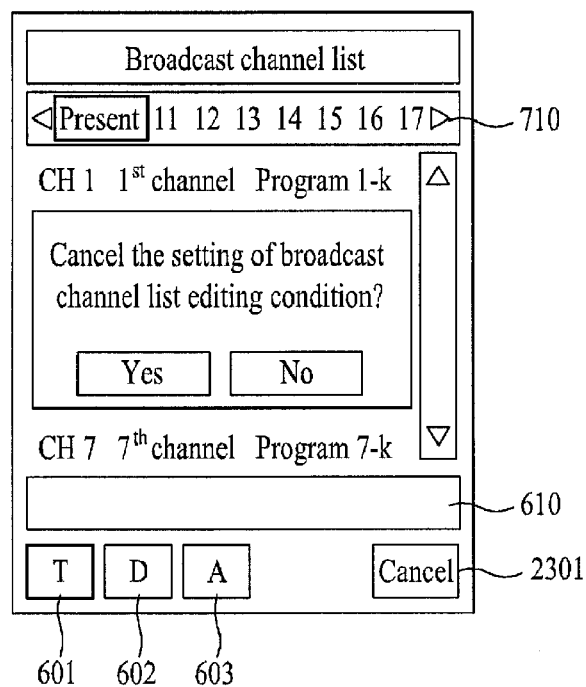

FIG. 23A and FIG. 23B are diagrams of screen configurations for displaying a broadcast channel list edited according to an editing condition of the present invention. First of all, if a menu item or key (or key region) corresponding to a broadcast channel list view is selected by a user, the mobile terminal 100 may display a broadcast channel list edited according to the editing condition set in FIG. 22B [FIG. 23A]. Of course, the mobile terminal 100 may display a broadcast channel list displayed at the timing point of the editing condition setting as a broadcast channel list edited according to the set editing condition. If 'cancel region' 2301 is selected in FIG. 23A, the mobile terminal 100 may output a text enabling a user to select whether to cancel the set editing condition [FIG. 23B].

For example, if cancel '(yes)' is selected in FIG. 23B, the mobile terminal 100 may cancel the set editing condition. Therefore, as a broadcast channel list displayed after the cancellation, it is possible to display the former broadcast channel list before receiving the input of the search condition in FIG. 22A [FIG. 6A]. Moreover, according to one embodiment of the present invention, the above-described broadcast information displaying method may be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

In accordance with one or more embodiments, in displaying a broadcast channel list, information on a broadcast program broadcasted for a specific time or a specific time interval specified by a user together with the broadcast channel list is provided. Further, in displaying a broadcast channel list, information on a broadcast program broadcasted for a specific date or a specific date interval as specified by a user together with the broadcast channel list is provided.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:
1. A mobile terminal, comprising:
a display configured to display a broadcast channel list including identification information of at least one broadcast channel;
a user input unit configured to receive input including a search condition for broadcast program information related to the at least one broadcast channel; and a controller configured to:
  search relevant broadcast program information for one or more broadcast channels of the at least one broadcast channel that corresponds to the search condition;
  control the display to display related information about one or more broadcast programs that satisfy the search condition; and
  control the display to display information on the broadcast channel list related to a progress state of a broadcast program of the one or more broadcast programs,
wherein the search condition comprises a time condition,
wherein the displayed information related to the progress state of the broadcast program comprises a first area and a second area, and
wherein the controller is further configured to:
  perform a first function related to the broadcast program when the first area of the displayed information related to the progress state of the broadcast program is selected;
  perform a second function related to the broadcast program or another broadcast program of the one or more broadcast programs when the second area of the displayed information related to the progress state of the broadcast program is selected;
  control the display to display a separate time bar representing the progress state for each of a plurality of broadcast programs of the at least one broadcast program, each of the separate time bars having an equal length and representing an entire duration of a corresponding broadcast program, at least two of the separate time bars representing broadcast programs of different durations, and each of the separate time bars configured to receive input of the time condition; and
  control the display to display remaining broadcast time information for the broadcast program corresponding to each of the separate time bars next to each of the separate time bars.

2. The mobile terminal of claim 1, wherein the search condition covers a plurality of broadcast channels or a single broadcast channel.

3. The mobile terminal of claim 1, further comprising:
  a wireless communication unit configured to receive the relevant broadcast program information; and
  a memory configured to store the received relevant broadcast program information under the control of the controller.

4. The mobile terminal of claim 1, wherein the controller is further configured to search for information on a broadcast program broadcasted at a specific time on a random broadcast channel when the input search condition includes the specific time.

5. The mobile terminal of claim 4, wherein the controller is further configured to control the display to display remaining broadcast time information from the specific time as the searched relevant broadcast information on the broadcast program broadcasted at the specific time.

6. The mobile terminal of claim 1, wherein the controller is further configured to search for information on a broadcast program broadcasted on a random broadcast channel in a specific time interval when the input search condition includes the specific time interval.

7. The mobile terminal of claim 1, wherein the controller is further configured to search for information on a broadcast program broadcasted on a random broadcast channel on a specific date when the input search condition includes the specific date.

8. The mobile terminal of claim 1, wherein the controller is further configured to search for information on a broadcast program broadcasted on a random broadcast channel in a specific date interval when the input search condition includes the specific date interval.

9. The mobile terminal of claim 1, wherein the controller is further configured to:
  set a broadcast channel list editing condition to the received search condition; and
  control the display to display the broadcast channel list edited to correspond to the set broadcast channel list editing condition.

10. The mobile terminal of claim 1, wherein:
  each of the separate time bars includes the first area and the second area;
  the first area of the displayed information related to the progress state of the broadcast program corresponding to each of the separate time bars corresponds to a first part of the time bar; and
  the second area of the displayed information related to the progress state of the broadcast program corresponding to each of the separate time bars corresponds to a second part of the time bar.

11. The mobile terminal of claim 10, wherein:
the first part of each of the separate time bars is colored; and
the second part of each of the separate time bars is blank.

12. The mobile terminal of claim 10, wherein:
  the broadcast program corresponding to each of the separate time bars is a currently broadcasted program;
  the another broadcast program is a broadcast program that is to be broadcasted immediately after the broadcasting of the currently broadcasted program;
  the second area of at least one of the displayed separate time bars corresponds to the another broadcast program;
  the first function comprises controlling the display, via the controller, to display detailed broadcast information of the broadcast program corresponding to one of the separate time bars; and
  the second function comprises controlling the display, via the controller, to display detailed broadcast information about the another broadcast program corresponding to the one of the separate time bars.

13. A method of displaying broadcast information in a mobile terminal, the method comprising:
  displaying, on a display of the mobile terminal, a broadcast channel list including identification information of at least one broadcast channel;
  receiving, via a user input unit of the mobile terminal, input including a search condition for broadcast program information related to the at least one broadcast channel, the search condition comprising a time condition;
  searching, under control of a controller of the mobile terminal, relevant broadcast program information for one or more broadcast channels of the at least one broadcast channel that corresponds to the search condition;
  controlling the display, via the controller, to display information on the broadcast channel list related to a progress state of a broadcast program of the one or more broadcast programs, the displayed information comprising a first area and a second area;
  receiving a selection of either the first area or the second area;
  performing a first function related to the broadcast program upon receipt of the selection of the first area;

performing a second function related to the broadcast program or another broadcast program of the one or more broadcast programs upon receipt of the selection of the second area;

controlling the display, via the controller, to display a separate time bar representing the progress state for each of a plurality of broadcast programs of the at least one broadcast program, each of the separate time bars having an equal length and representing an entire duration of a corresponding broadcast program, at least two of the separate time bars representing broadcast programs of different durations, and each of the separate time bars configured to receive input of the time condition; and controlling the display, via the controller, to display remaining broadcast time information for the broadcast program corresponding to each of the separate time bars next to each of the separate time bars.

14. The method of claim 13, further comprising:
receiving, via a wireless communication unit of the mobile terminal, the relevant broadcast program information; and
storing, under the control of the controller, the received relevant broadcast program information in a memory of the mobile terminal.

15. The method of claim 13, wherein searching the relevant broadcast program information comprises:
determining whether the input search condition includes a specific time; and
searching for information on a broadcast program broadcasted at the specific time on a random broadcast channel when it is determined that the input search condition includes the specific time.

16. The method of claim 15, further comprising controlling the display, via the controller, to display remaining broadcast time information from the specific time as the searched relevant broadcast information on the broadcast program broadcasted at the specific time.

17. The method of claim 13, wherein searching the relevant broadcast program information comprises:
determining whether the input search condition includes a specific time interval; and
searching for information on a broadcast program broadcasted on a random broadcast channel in the specific time interval when it is determined that the input search condition includes the specific time interval.

18. The method of claim 13, wherein searching the relevant broadcast program information comprises:
determining whether the input search condition includes a specific date; and
searching for information on a broadcast program broadcasted on a random broadcast channel on the specific date when it is determined that the input search condition includes the specific date.

19. The method of claim 13, wherein searching the relevant broadcast program information comprises:
determining whether the input search condition includes a specific date interval; and
searching for information on a broadcast program broadcasted on a random broadcast channel in the specific date interval when it is determined that the input search condition includes the specific date interval.

20. The method of claim 13, further comprising:
setting a broadcast channel list editing condition for the input search condition; and
controlling the display, via the controller, to display a broadcast channel list edited to correspond to the set broadcast channel list editing condition.

21. The method of claim 13, wherein:
each of the separate time bars includes the first area and the second area;
the first area of the displayed information related to the progress state of the broadcast program corresponding to each of the separate time bars corresponds to a first part of the time bar; and
the second area of the displayed information related to the progress state of the broadcast program corresponding to each of the separate time bars corresponds to a second part of the time bar.

22. The method of claim 21, wherein:
the first part of each of the separate time bars is colored; and
the second part of each of the separate time bars is blank.

23. The method of claim 21, wherein:
the broadcast program corresponding to each of the separate time bars is a currently broadcasted program;
the another broadcast program is a broadcast program that is to be broadcasted immediately after the broadcasting of the currently broadcasted program;
the second area of at least one of the displayed separate time bars corresponds to the another broadcast program;
the first function comprises controlling the display, via the controller, to display detailed broadcast information of the broadcast program corresponding to one of the separate time bars; and
the second function comprises controlling the display, via the controller, to display detailed broadcast information about the another broadcast program corresponding to the one of the separate time bars.

* * * * *